US012647500B2

(12) United States Patent
Jung et al.

(10) Patent No.: US 12,647,500 B2
(45) Date of Patent: Jun. 2, 2026

(54) ELECTRONIC APPARATUS INCLUDING FLEXIBLE DISPLAY

(71) Applicant: SAMSUNG ELECTRONICS CO., LTD., Suwon-si (KR)

(72) Inventors: Jihyung Jung, Suwon-si (KR); Minuk Kim, Suwon-si (KR); Sungho Ahn, Suwon-si (KR); Bowon Jung, Suwon-si (KR); Joungmin Cho, Suwon-si (KR); Sungdae Choi, Suwon-si (KR); Kwangtai Kim, Suwon-si (KR); Donghyun Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 522 days.

(21) Appl. No.: 18/298,637

(22) Filed: Apr. 11, 2023

(65) Prior Publication Data

US 2023/0247119 A1      Aug. 3, 2023

Related U.S. Application Data

(63) Continuation of application No. PCT/KR2021/015557, filed on Nov. 1, 2021.

(30) Foreign Application Priority Data

Nov. 18, 2020   (KR) ........................ 10-2020-0154891
Feb. 23, 2021   (KR) ........................ 10-2021-0024244

(51) Int. Cl.
  *G06F 3/041*       (2006.01)
  *G06F 1/16*        (2006.01)
  *H04M 1/02*        (2006.01)
(52) U.S. Cl.
  CPC ........ *H04M 1/0235* (2013.01); *G06F 1/1624* (2013.01); *G06F 1/1643* (2013.01);
  (Continued)

(58) Field of Classification Search
  None
  See application file for complete search history.

(56) References Cited

U.S. PATENT DOCUMENTS 7,002,644 B2   2/2006   You et al.
7,552,861 B2   6/2009   Chen et al.
(Continued)

FOREIGN PATENT DOCUMENTS

CN       110445899 A    11/2019
KR     20040084464 A    10/2004
(Continued)

OTHER PUBLICATIONS

Korean Notice of Patent Grant dated Jul. 28, 2025 for KR10-2021-0024244.

*Primary Examiner* — Idowu O Osifade

(74) *Attorney, Agent, or Firm* — Nixon & Vanderhye P.C.

(57) ABSTRACT

An electronic apparatus may include: a housing including a first housing, which forms the side surfaces and rear surface of the electronic apparatus, and a second housing, which is connected to the first housing so as to be able to move relative to the first housing; a flexible display including a first region, which is exposed to the outside of the housing, and a second region, which extends from the first region and is inserted into or drawn out of the housing as the second housing slides relative to the first housing; a first digitizer coupled to the first region of the flexible display; a plate located inside the electronic apparatus; and a second digitizer disposed on the plate, wherein, in a state in which the second region has been drawn out of the housing, the second digitizer can be positioned corresponding to the drawn out second region.

17 Claims, 24 Drawing Sheets

(52) U.S. Cl.
CPC ........ *G06F 1/1652* (2013.01); *G06F 3/04166*
(2019.05); *H04M 1/0268* (2013.01); *G06F*
*2203/04102* (2013.01); *G06F 2203/04107*
(2013.01); *H04M 2250/22* (2013.01)

(56) References Cited

U.S. PATENT DOCUMENTS

| | | | |
|---|---|---|---|
| 9,904,460 | B2 | 2/2018 | Winebrand |
| 10,019,114 | B2 | 7/2018 | Byun et al. |
| 10,495,941 | B2 | 12/2019 | Hashimoto et al. |
| 10,747,344 | B2 | 8/2020 | Shi |
| 10,878,728 | B2 | 12/2020 | Yoon |
| 10,936,017 | B1 | 3/2021 | Choi et al. |
| 2013/0285938 | A1 | 10/2013 | Kang |
| 2014/0211399 | A1 | 7/2014 | O'brien |
| 2018/0014417 | A1 | 1/2018 | Seo et al. |
| 2018/0018033 | A1 | 1/2018 | Song |
| 2019/0267430 | A1 | 8/2019 | Choi et al. |
| 2019/0305237 | A1 | 10/2019 | Shin et al. |
| 2020/0329572 | A1 | 10/2020 | Wittenberg et al. |
| 2021/0135151 | A1 | 5/2021 | Baek et al. |
| 2021/0240294 | A1 | 8/2021 | Ko et al. |
| 2021/0306446 | A1 | 9/2021 | Choi et al. |
| 2022/0279666 | A1* | 9/2022 | Park ................. H04M 1/72436 |
| 2023/0156116 | A1* | 5/2023 | Yoon ........................ G09F 9/30 |
| | | | 455/575.4 |

FOREIGN PATENT DOCUMENTS

| | | | |
|---|---|---|---|
| KR | 20130119250 | A | 10/2013 |
| KR | 20130120721 | A | 11/2013 |
| KR | 20160061170 | A | 5/2016 |
| KR | 20170040408 | A | 4/2017 |
| KR | 20180006533 | A | 1/2018 |
| KR | 20190020495 | A | 3/2019 |
| KR | 102017773 | B1 | 10/2019 |
| KR | 20190113128 | A | 10/2019 |
| KR | 20190124009 | A | 11/2019 |
| KR | 102058548 | B1 | 12/2019 |
| KR | 20200007366 | A | 1/2020 |
| KR | 102113963 | B1 | 5/2020 |
| KR | 20210143007 | A | 11/2021 |
| KR | 20220128381 | A | 9/2022 |
| KR | 20220130152 | A | 9/2022 |
| WO | 2019146865 | A1 | 8/2019 |

* cited by examiner

670

671

670

ELECTRONIC APPARATUS INCLUDING FLEXIBLE DISPLAY

CROSS-REFERENCE TO RELATED APPLICATIONS

This application is a continuation of International Application No. PCT/KR2021/015557 filed on Nov. 1, 2021, designating the U.S., and claiming priority to Korean Patent Application No. 10-2020-0154891 filed on Nov. 18, 2020 and Korean Patent Application No. 10-2021-0024244 filed on Feb. 23, 2021, in the Korean Intellectual Property Office, the disclosures of all of which are hereby incorporated by reference herein in their entireties.

BACKGROUND

Field

Various example embodiments relate to an electronic device including a flexible display.

Description of Related Art

In line with development of display technologies, there have been active research and development regarding electronic devices including flexible displays. The flexible displays can be folded, bent, rolled, or unfolded, and thus are expected to make significant contributions to reduced volumes of electronic devices or design changes of electronic devices.

Digitizers are applied to convert analog coordinates of input devices (for example, stylus pens) to digital data. When an electronic device includes a flat display, a single digitizer may be applied to recognize coordinates of the display region. However, there may be difficulty in applying digitizers as electronic devices include flexible displays.

SUMMARY

When a digitizer is applied to an electronic device including a flexible display, a single digitizer may be disposed on, directly or indirectly, the back surface of the flexible display, and a magnetic field may be sensed through an input device (for example, a stylus pen), thereby recognizing coordinates. Expansion and reduction of the screen of an electronic device (for example, a slidable phone or a rollable phone) may cause a digitizer sensing pattern and/or a shielding sheet (for example, a magnetic metal powder (MMP) sheet) to crack and/or fracture at a rolling portion (for example, a hinge portion).

An example embodiment may provide an electronic device (for example, a slidable phone or a rollable phone) having a digitizer configured not to be fractured even if the screen is expanded and reduced.

According to various example embodiments, an electronic apparatus may include a housing including a first housing forming side surfaces and a rear surface of the electronic apparatus and a second housing connected, directly or indirectly, to the first housing so as to be movable relative to the first housing, a flexible display including a first area and a second area, the first area being exposed to the outside of the housing, the second area extending from the first area and being configured to be inserted into the housing and or withdrawn to the outside as the second housing slides relative to the first housing, a first digitizer coupled, directly or indirectly, to the first area of the flexible display, a plate disposed inside the electronic apparatus, and a second digitizer disposed on, directly or indirectly, the plate, the second digitizer being positioned to correspond to the second area in a state where the second area has been withdrawn to the outside of the housing.

According to various example embodiments, a digitizer sensing pattern and/or a shielding sheet (for example, MMP sheet) may be prevented or reduced from cracking and/or fracturing due to expansion and reduction of the screen of an electronic device (for example, a slidable phone or a rollable phone).

According to various example embodiments, when the screen of an electronic device (for example, a slidable phone or a rollable phone) is expanded, sensing interference and/or touch interference of a digitizer may be prevented or reduced.

Various other advantageous effects identified explicitly or implicitly through the disclosure may be provided.

BRIEF DESCRIPTION OF DRAWINGS

The above and other aspects, features and advantages of certain embodiments will be more apparent from the following detailed description, taken in conjunction with the accompanying drawings, in which.

In connection with the description of the drawings, same or similar reference numerals will be used to refer to same or similar elements.

DETAILED DESCRIPTION

Figure 1:
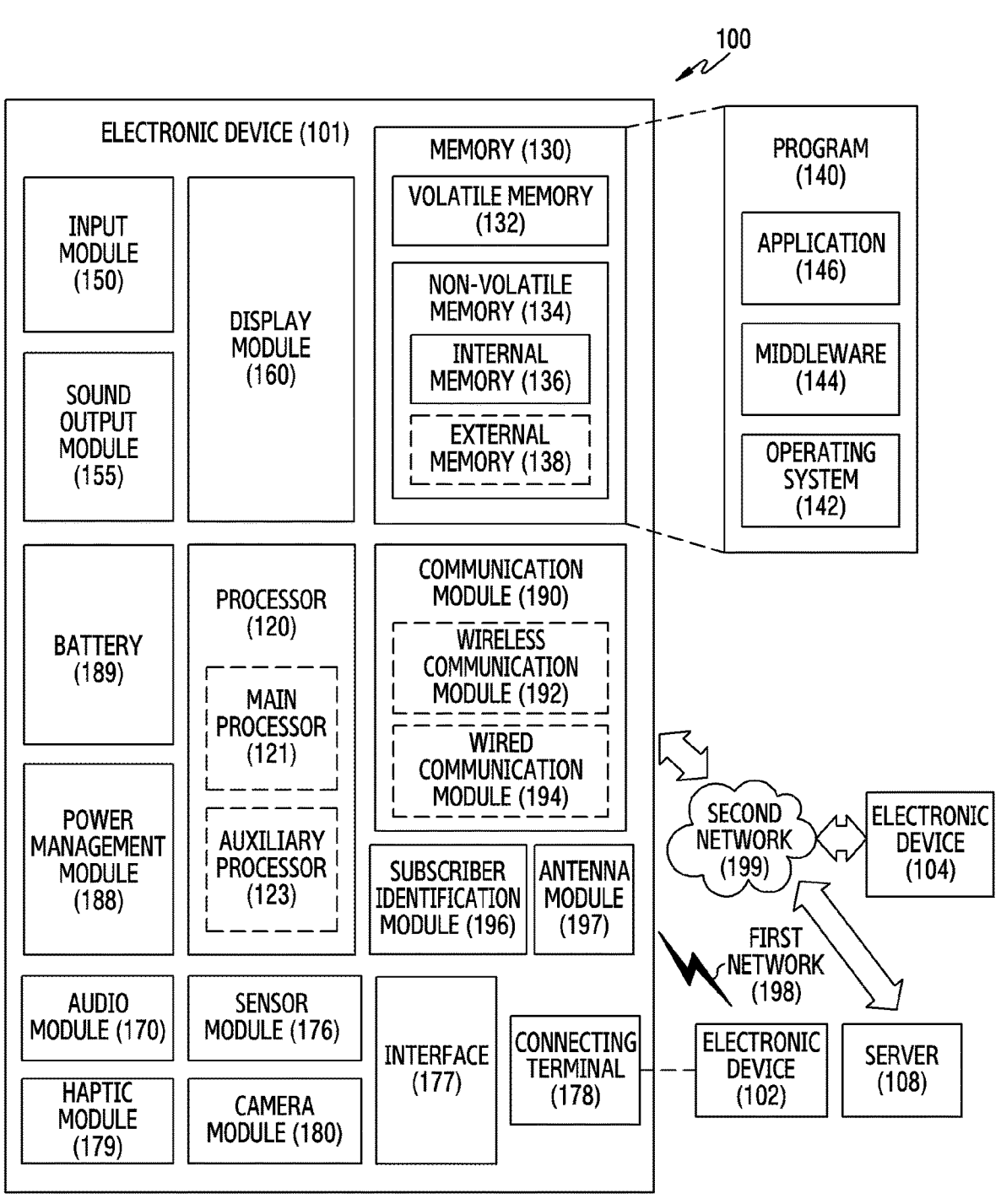
FIG. 1 is a block diagram of an electronic apparatus in a network environment according to various example embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be integrated into a single component (e.g., the display module 160).

The processor 120 may execute, for example, software (e.g., a program 140) to control at least one other component (e.g., a hardware or software component) of the electronic device 101 coupled, directly or indirectly, with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as a part of another component (e.g., the camera module 180 or the communication module 190) functionally related to the auxiliary processor 123. According to an embodiment, the auxiliary processor (e.g., a neural processing unit (NPU)) may include a hardware structure specific to processing of an artificial intelligence model. The artificial model may be generated through machine learning. For example, this learning may be performed by the electronic device 101 itself where artificial intelligence is executed, and may also be performed through a separate server (e.g., the server 108). A learning algorithm may include, for example, supervised learning, unsupervised learning, semi-supervised learning, or reinforcement learning, but is not limited to the above examples. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep brief network (DBN), a bidirectional recurrent deep neural network (BRDNN), a deep Q-network, and a combination of two or more thereof, but is not limited to the above examples. Additionally or alternatively, the artificial intelligence model may include a software structure, in addition to the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a sensor circuit (e.g., a pressure sensor) adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support 5G networks and next-generation communication technologies beyond 4G networks, for example, a new radio (NR) access technology. The NR access technology may support enhanced mobile broadband (eMBB), massive machine type communications (mMTC), or ultra-reliable and low-latency communications (URLLC). The wireless communication module 192 may support high-frequency bands (e.g., the mmWave band), for example, in order to achieve a high data transfer rate. The wireless communication module 192 may support various technologies for ensuring performance in high-frequency bands, such as beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of lms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on or adjacent to, directly or indirectly, a first surface (e.g., the bottom surface) of the printed circuit board and capable of supporting a designated high-frequency band (e.g., the mm Wave band), and a plurality of antennas (e.g., an array antenna) disposed on or adjacent to, directly or indirectly, second surface (e.g., the top or side surface) of the printed circuit board and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled, directly or indirectly, with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultralow-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
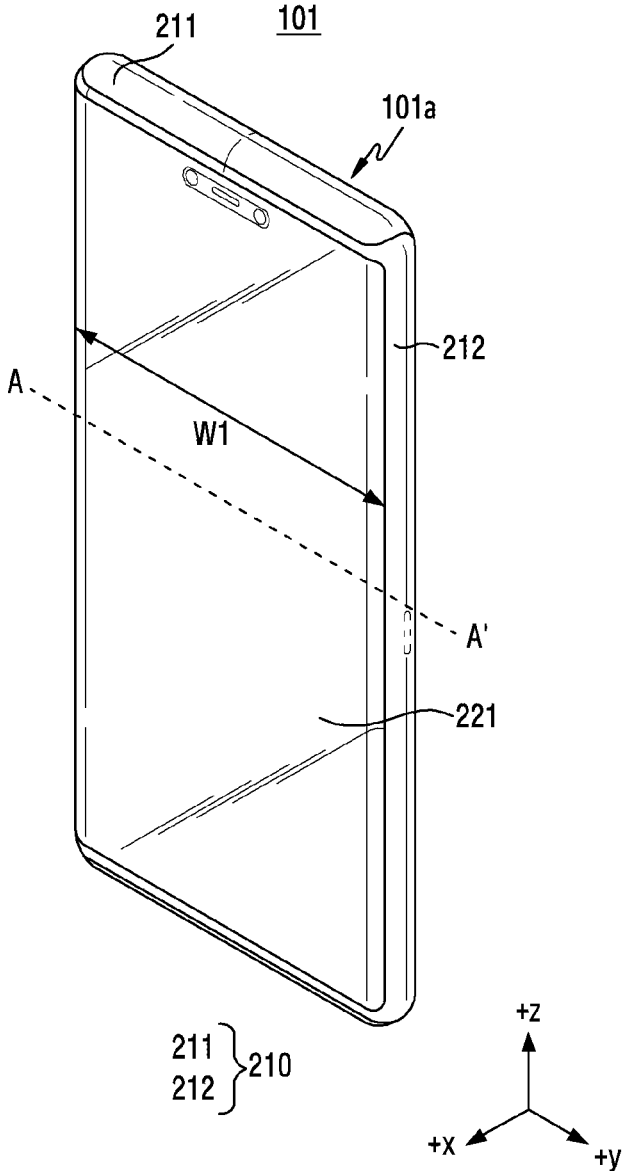
FIG. 2A is a front perspective view showing an electronic apparatus in a first state (e.g., a reduction state) according to an example embodiment.
Figure 2B:
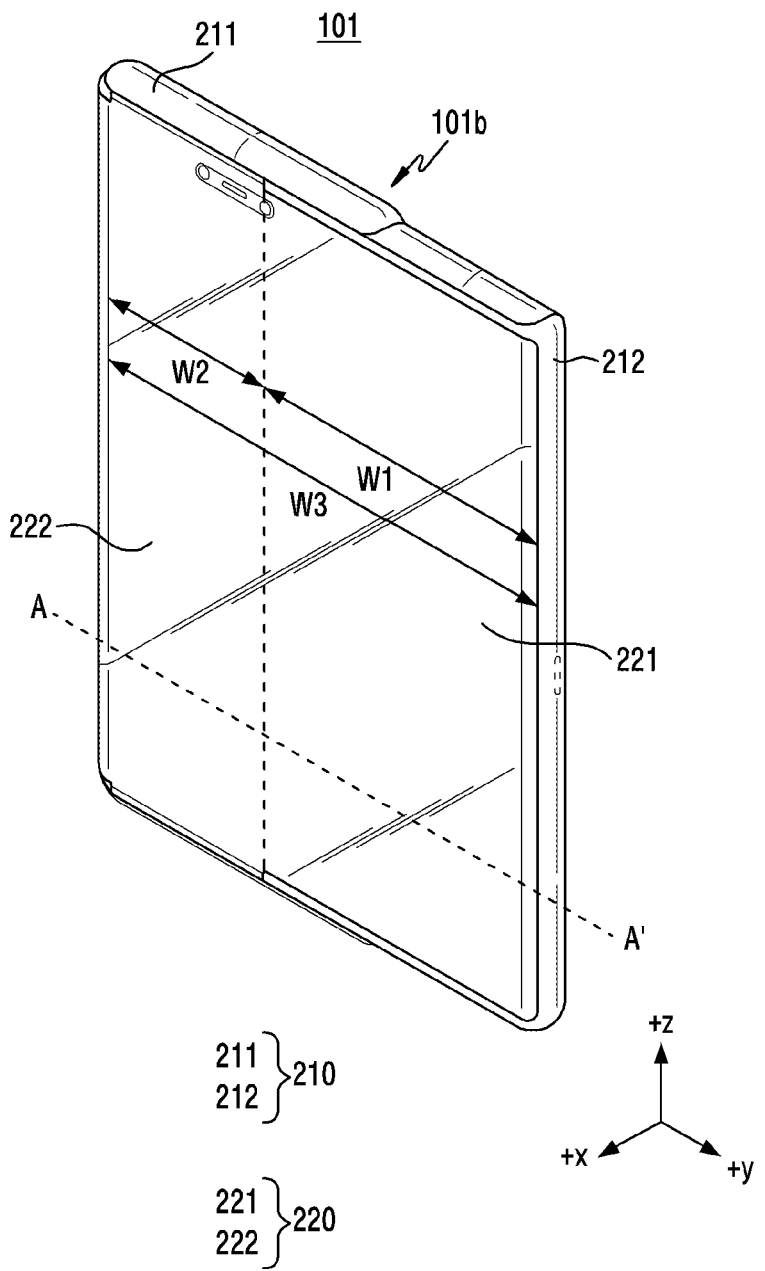
FIG. 2B is a front perspective view showing an electronic apparatus in a second state (e.g., an expansion state) according to an example embodiment.

FIG. 2A is a front perspective view showing an electronic apparatus 101 in a first state (e.g., a reduction state) according to an embodiment. FIG. 2B is a rear perspective view showing an electronic apparatus 101 in a second state (e.g., an expansion state) according to an embodiment.

According to various example embodiments, a surface, which is oriented in substantially the same direction as a direction in which at least a part (e.g., the first area 221) of a flexible display 220 positioned outside the electronic apparatus 101 is oriented, may be the front surface (or the frontal surface) of the electronic apparatus 101, and a surface opposite to the front surface may be the rear surface (or the back surface) of the electronic apparatus 101. Surfaces, which surround a space between the front surface and the rear surface, may be the side surfaces of the electronic apparatus 101.

In an embodiment, the flexible display 220 may be disposed in at least a part of the electronic apparatus 101. In an example, the flexible display 220 may include at least a part having a flat-surface shape and at least a part having a curved-surface shape. In an example, the flexible display 220 and a slidable housing 210 for surrounding at least a part of the edge of the flexible display 220 may be arranged on the front surface of the electronic apparatus 101.

In an embodiment, the slideable housing 210 may form a partial area of the front surface (e.g., the surface of the electronic apparatus 101, which is oriented in the +x direction in FIG. 2A and FIG. 2B), the rear surface (e.g., the surface of the electronic apparatus 101, which is oriented in the −x direction in FIG. 2A and FIG. 2B), and the side surfaces (e.g., the surfaces for connecting the front surface and the rear surface of the electronic apparatus 101) of the electronic apparatus 101.

In an embodiment, the slidable housing 210 may include a first housing 211 and a second housing 212 coupled, directly or indirectly, to be movable relative to the first housing 211 in a predetermined range.

In an embodiment, the flexible display 220 may include a first area 221 capable of being coupled, directly or indirectly, to the second housing 212, and a second area 222 which extends from the first area 221 and thus is able to be inserted into the electronic apparatus 101.

In an embodiment, the flexible display 220 may be exposed so that the first area 221 has a first width W1. The second area 222 of the flexible display 220 may move as much as a second width W2 maximally through a sliding operation in a first direction (e.g., the +y direction) of the second housing 212. That is, the flexible display 220 may extend from the first width W1 by the second width W2 and thus be exposed while having a third width W3.

In an embodiment, the electronic apparatus 101 may include a first state 101a and a second state 101b. For example, the first state 101a and the second state 101b of the electronic apparatus 101 may be determined according to a relative position of the second housing 212 in the slidable housing 210, and the electronic apparatus 101 may be configured such that a state thereof is changed between the first state 101*a* and the second state 101*b* by a user manipulation or a mechanical operation.

In an embodiment, the first state 101*a* of the electronic apparatus 101 may indicate a state before the slidable housing 210 is expanded. In an example, the first area 221 of the flexible display 220, which has the first width W1 in the first state 101*a*, may be exposed to the outside.

In an embodiment, the electronic apparatus 101 may include an intermediate state which is a state between the first state 101*a* and the second state 101*b*. In an example, the intermediate state of the electronic apparatus 101 may be referred to as a free stop state.

In an embodiment, the second state 101*b* of the electronic apparatus 101 may indicate a state where the slidable housing 210 is expanded. In an example, the second area 222 of the flexible display 220, which has the second width W2 in the second state 101*b*, may be exposed to the outside.

In an embodiment, in case that the electronic apparatus 101 is switched from the first state 101*a* to the second state 101*b* according to a movement of the second housing 212, the second area 222 of the flexible display 220 may be withdrawn (or exposed) from the inside to the outside of the electronic apparatus 101. In an embodiment, that the flexible display 220 is withdrawn (or exposed) therefrom may indicate that the flexible display is viewable from the outside of the electronic apparatus 101. In another embodiment, in case that the electronic apparatus 101 is switched from the second state 101*b* to the first state 101*a* according to a movement of the second housing 212, the second area 222 of the flexible display 220 may be inserted into the electronic apparatus 101. In an example, that the flexible display 220 is inserted thereinto may indicate that the flexible display is not viewable from the outside of the electronic apparatus 101.

Figure 2C:
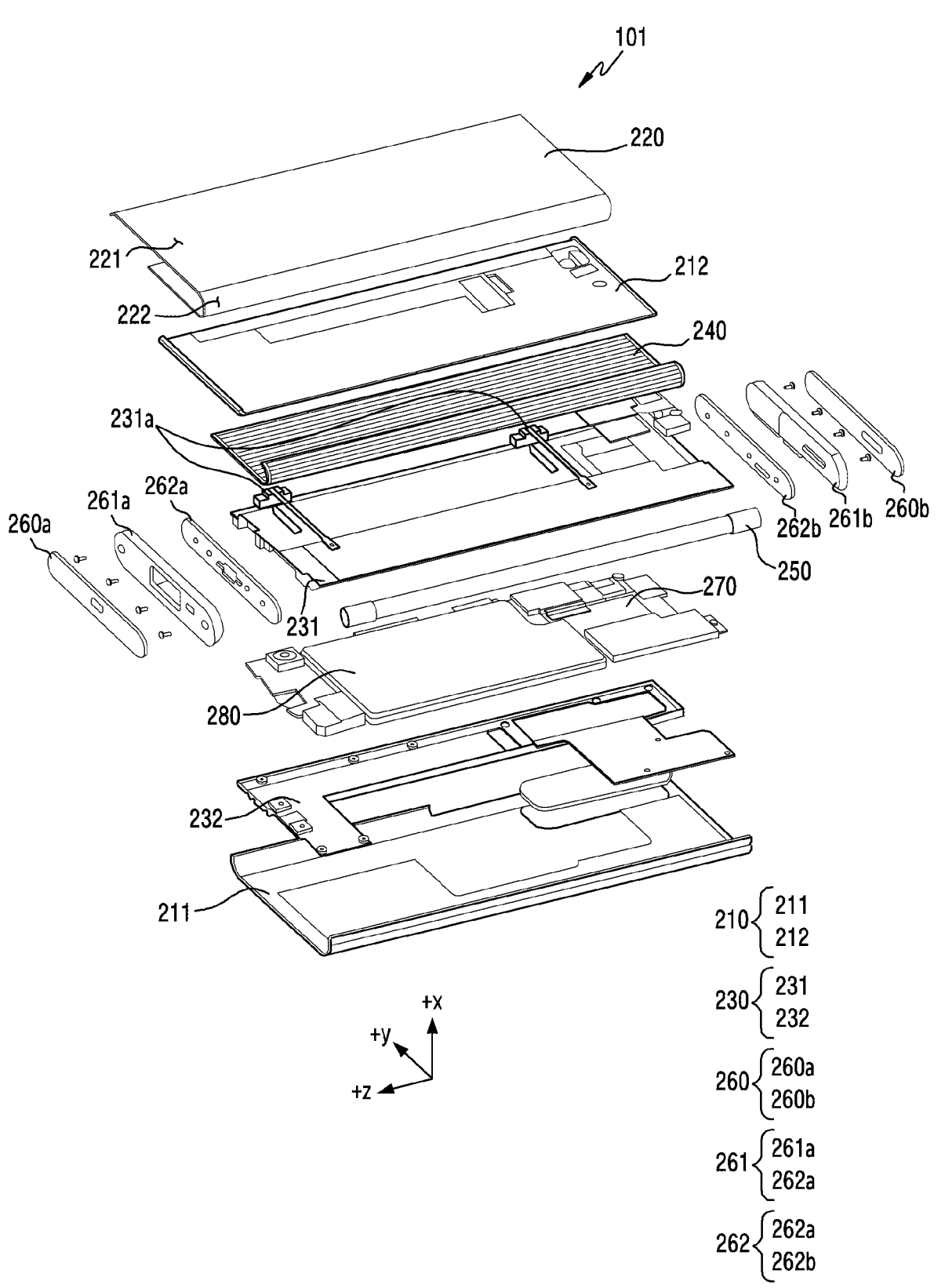
FIG. 2C is an exploded view showing an electronic apparatus according to an example embodiment.

FIG. 2C is an exploded view of an electronic apparatus 101 according to an embodiment.

At least one of the elements of the electronic apparatus 101 may be the same as or similar to at least one of the elements of the electronic apparatus 101 in FIG. 2A and FIG. 2B, and overlapping descriptions thereof will be omitted hereinafter.

In an embodiment, the electronic apparatus 101 may include the flexible display 220, the slidable housing 210, a mid-plate 230, a multi-bar 240, a drive part 250, a side cover 260, a fixation member 261, a rail member 262, a printed circuit board 270, and/or a battery 280. In an example, at least one of the elements of the electronic apparatus 101 may be omitted, or the electronic apparatus may additionally include other elements. At least one of the elements of the electronic apparatus 101 may be the same as or similar to at least one of the elements of the electronic apparatus 101 in FIG. 2A and FIG. 2B, and overlapping descriptions thereof will be omitted hereinafter.

In an embodiment, the slidable housing 210 of the electronic apparatus 101 may include a front cover (not shown) disposed to cover one area of the flexible display 220, the first housing 211 forming the rear surface of the electronic apparatus 101, the second housing 212 movably coupled thereto through a sliding operation, between at least the front cover and the first housing 211, and the side cover 260 disposed to cover the side surfaces in a direction substantially perpendicular to a direction in which the second housing 212 moves.

In an embodiment, the first housing 211 may further include a portion extending in the direction of the front surface of the electronic apparatus 101, and the extended portion may form the side surfaces of the electronic apparatus 101. In an example, the first housing 211 may be coupled to the rear surface of a second mid-plate 232.

In an embodiment, the slidable housing 210 may have electronic components arranged in an inner space thereof. For example, the printed circuit board 270, on which the battery 280 and various electronic elements (e.g., a processor, a control circuit, a memory, and/or an interface) are arranged, may be disposed in the inner space.

In an embodiment, the mid-plate 230 may include a first mid-plate 231 and the second mid-plate 232.

In an embodiment, the second housing 212 may be slidably disposed on, directly or indirectly, the first mid-plate 231. For example, a sliding structure for supporting and guiding coupling therebetween and a movement of the second housing 212 may be provided between at least the second housing 212 and the first mid-plate 231. In an example, the second housing 212 may include at least one elastic structure 231*a*. In case that the second housing 212 is moved by a predetermined distance by an external force, the electronic apparatus 101 may be switched from the first state 101*a* to the second state 101*b* due to the at least one elastic structure 231*a* even without a further external force. The at least one elastic structure 231*a* may be implemented using various elastic members such as a torsion spring. For example, the at least one elastic structure 231*a* may be a torsion spring, and include one end connected to the second housing 212, the other end connected to the first mid-plate 231, and a spring part between the one end and the other end. In case that the second housing 212 is moved by a predetermined distance in the first direction (e.g., the +y direction) of a slide-out thereof by an external force, the position of one end relative to the other end thereof may be changed and thus the second housing 212 may move in the first direction due to the elasticity of the spring part without a further external force, so that the electronic apparatus is switched from the first state 101*a* to the second state 101*b*. In case that the second housing 212 is moved by a predetermined distance in a second direction (e.g., the −y direction) opposite to the first direction by an external force, the position of one end relative to the other end thereof may be changed and thus the second housing 212 may move in the second direction due to the elasticity of the spring part without a further external force, so that the electronic apparatus is switched from the second state 101*b* to the first state 101*a*.

In an embodiment, the flexible display 220 may include a display panel layer and one or more plates seated on the display panel layer. In an example, the flexible display 220 may include the first area 221 exposed to the outside 221, and the second area 222 which extends from the first area 221 and is inserted into the slidable housing 210 or withdrawn to the outside as the second housing 212 moves relative to the first mid-plate 231.

In an embodiment, the flexible display 220 may be based on at least one of organic light emitting diodes (OLEDs), liquid crystal displays (LCDs), and light emitting diodes (LEDs), and thus the flexible display 220 may visually output information to the user. In order to more intuitively control a user interface output through the flexible display 220, the electronic apparatus 101 may include a touch screen panel (TSP) disposed on the flexible display 220. The touch sensor panel may detect a position of an object (for example, a user finger or a stylus pen) which touches the flexible display 220 or hovers over the flexible display 220, by using at least one of a resistive film, capacitive components, surface acoustic waves, and infrared rays.

In an embodiment, the flexible display 220 may be movably coupled, directly or indirectly, to the slidable housing 210. In an example, the flexible display 220 may be coupled onto the second housing 212 and the first mid-plate 231.

In an embodiment, the multi-bar 240 may be attached to the rear surface of the second area 222 of the flexible display 220. The multi-bar 240 may have multiple bars connected in connection with each other and thus may be disposed in a manner of being bent along the outer circumferential surface of the drive part 250.

In an example, the multi-bar 240 may guide bending of the flexible display 220. In an example, the second area 222 of the flexible display 220 may be guided in a manner of being rolled (or bent) by the outer surface of the multi-bar 240. In an example, the multi-bar 240 may be coupled to the rail member 262 to move.

In an embodiment, the printed circuit board 270 may be disposed between at least the first mid-plate 231 and the second mid-plate 232.

In an embodiment, the side cover 260 may include a first side cover 260a and a second side cover 260b. The first side cover 260a may be coupled to the slidable housing 210 on the side of a first fixation member 261a. The second side cover 260b may be coupled to the slidable housing 210 on the side of the second fixation member 261b.

In an embodiment, the first fixation member 261a including a first rail member 262a may be coupled to one side of the slidable housing 210. The second fixation member 261b including a second rail member 262b may be coupled to the other side of the slidable housing 210. In an example, the second fixation member 261b may be positioned at the side opposite to the first fixation member 261a. In an example, the rail member 262 including the first rail member 262a and the second rail member 262b may be disposed such that the relative sliding motion of the second housing 212 relative to the first mid-plate 231 is induced.

In an embodiment, at least a part of the slidable housing 210, the first mid-plate 231, and/or the second mid-plate 232 may include a metal material or a non-metal material (e.g., polymer). In an example, at least a part of the slidable housing 210, the first mid-plate 231, and/or the second mid-plate 232 may be integrally implemented.

In an embodiment, the drive part 250 may include a cylindrical roller extending in a direction (e.g., the −z-axis direction) from the first side cover 260a toward the second side cover 260b.

According to an embodiment, the battery 280 may be disposed inside the electronic apparatus 101 to supply power to at least one element of the electronic apparatus 101. For example, the battery 280 may include a non-rechargeable primary battery, a rechargeable secondary battery, or a fuel cell. According to an embodiment, the battery 280 may be integrally disposed inside the electronic apparatus 101, but is not limited thereto. In addition, the battery 280 according to another embodiment may be disposed detachably from the electronic apparatus 101.

Figure 3:
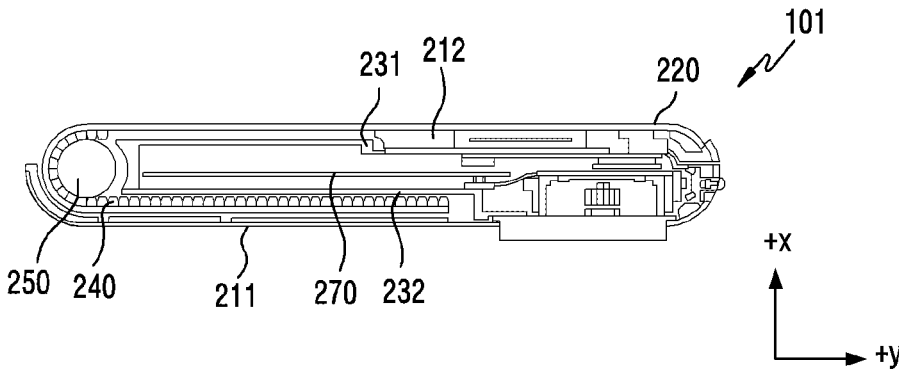
FIG. 3 shows a cross sectional view of an electronic apparatus 101 taken along line A-A' in FIG. 2A according to an example embodiment.
Figure 4:
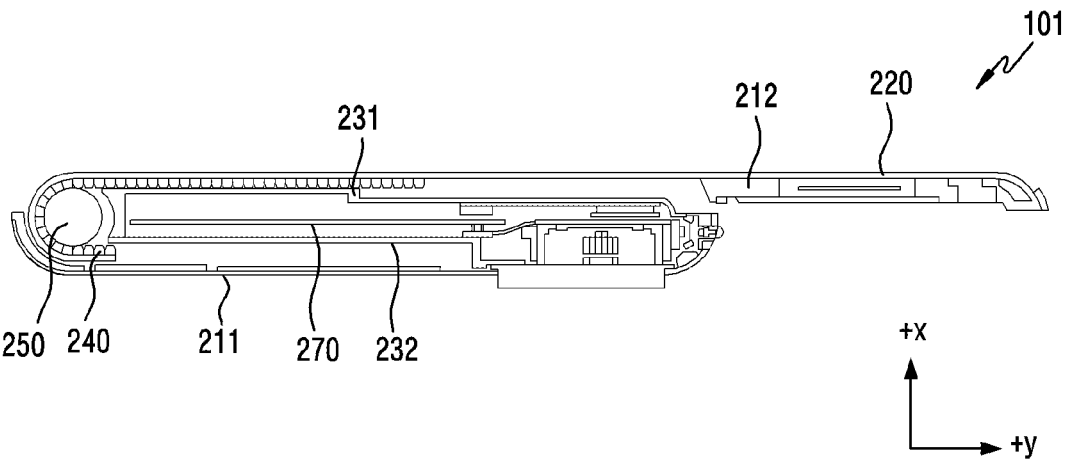
FIG. 4 shows a cross sectional view of an electronic apparatus 101 taken along line A-A' in FIG. 2B according to an example embodiment.

FIG. 3 shows a cross sectional view of an electronic apparatus 101 taken along line A-A' in FIG. 2A according to an embodiment. FIG. 4 shows a cross sectional view of an electronic apparatus 101 taken along line A-A' in FIG. 2B according to an embodiment.

Referring to FIG. 3 and FIG. 4, the electronic apparatus 101 may include the flexible display 220, the first housing 211, the second housing 212, the first mid-plate 231, the second mid-plate 232, the multi-bar 240, the drive part 250 and/or the printed circuit board 270.

In an embodiment, the printed circuit board 270 may be disposed in at least a partial area inside the electronic apparatus 101. For example, the printed circuit board 270 may be disposed between at least the first mid-plate 231 and the second mid-plate 232. In an example, the printed circuit board 270 may be a printed circuit board formed of a material (e.g., FR4) having a non-bending property. In another example, the printed circuit board 270 may be a flexible circuit board having a bendable property (or a flexible property).

According to an embodiment, multiple electronic components may be arranged on the printed circuit board 270. In an example, a processor (e.g., the processor 120 in FIG. 1), a memory (e.g., the memory 130 in FIG. 1), a control circuit, and/or an interface (e.g., the interface 177 in FIG. 1) may be arranged on the printed circuit board 270.

In an embodiment, the flexible display 220 may be coupled to the second housing 212, and a flat-surface portion corresponding to the front surface of the first mid-plate 231 and a curved-surface portion corresponding to the side surfaces of the second housing 212. The curved-surface may be formed by the multi-bar 240 connected, directly or indirectly, to the second housing 212. The multi-bar 240 may include multiple bars. The multi-bar 240 may be attached to the rear surface of the flexible display 220 so as to guide bending of the flexible display 220.

Figure 6:
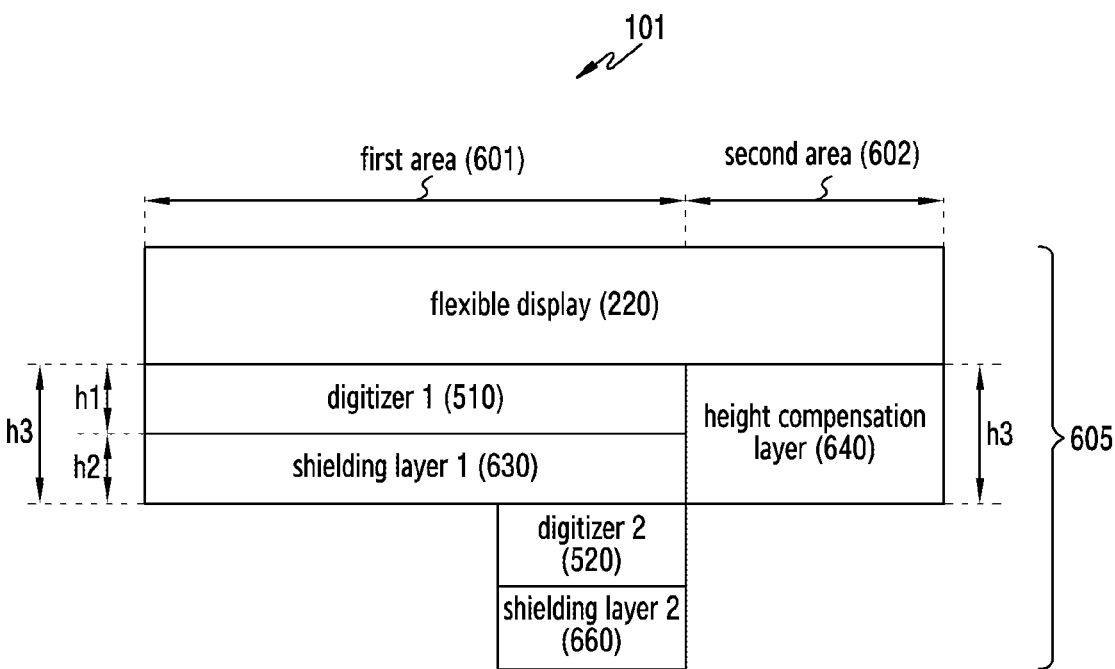
FIG. 6 is a view showing a structure of a display module according to an example embodiment.

In an embodiment, the flexible display 220 may include a digitizer drive IC (e.g., the digitizer drive IC 1430 in FIG. 14) for driving multiple digitizers (e.g., the first digitizer 510 and the second digitizer 520 in FIG. 6).

In an embodiment, the flexible display 220 may include a flexible printed circuit board (FPCB) (not shown) electrically connected, directly or indirectly, to the printed circuit board 270. In an example, the flexible printed circuit board may include a control circuit disposed in a chip on film (COF) manner. In an embodiment, a display diver IC (DDI), a touch display driver IC (TDDI), and/or a digitizer drive IC 1430 may be included in the control circuit included in the flexible printed circuit board.

As an embodiment, multiple digitizers (e.g., the multiple digitizers 510 and 520 in FIG. 6), multiple shielding layers (e.g., the multiple shielding layers 630 and 660 (shielding sheets) in FIG. 6), and height compensation layers (e.g., the height compensation layer 640 in FIG. 6) may be arranged on the rear surface (e.g., in the −x-axis direction) of the flexible display 220. A display module (e.g., the display module 605 in FIG. 6, comprising a display) may be configured by the flexible display 220, multiple digitizers (e.g., the multiple digitizers 510 and 520 in FIG. 6), multiple shielding layers (e.g., the multiple shielding layers 630 and 660 (shielding sheets) in FIG. 6), and height compensation layers (e.g., the height compensation layer 640 in FIG. 6). The configuration and/or structure of a display module 605 will be described later with reference to FIG. 6 to FIG. 9B.

As various embodiments, the flexible display 220 may have a width exposed to the outside and adjusted based on a sliding operation of the second housing 212.

As various embodiments, the flexible display 220 may include a display panel and a control circuit (not shown). For example, the flexible display 220 may include an active matrix organic light emitting diode (AMOLED) display or a passive matrix organic light emitting diode (PMOLED) display, but is not limited thereto. In an embodiment, the display panel may be a flexible display panel (e.g., an organic light emitting diode (OLED) panel). For example, the flexible display panel may be various displays including at least one thin film transistor (TFT), and the at least one TFT may be implemented as an amorphous silicon (a-Si)

TFT, a low-temperature polycrystalline oxide (LTPO) TFT, or a low-temperature polycrystalline silicon (LTPS) TFT.

In an embodiment, the display panel may include multiple pixels for displaying an image, and one pixel may include multiple sub-pixels. As an embodiment, one pixel may include a red sub-pixel, a green sub-pixel, and a blue sub-pixel of three colors. As an embodiment, one pixel may include a red sub-pixel, a green sub-pixel, a blue sub-pixel, and a white sub-pixel of four colors. As an embodiment, one pixel may be formed in an RGBG pentile manner in which one red sub-pixel, two green sub-pixels, and one blue sub-pixel are included.

In an embodiment, the second housing 212 and the first mid-plate 231 may support the flexible display 220. The second housing 212 may slide in the side-surface direction (e.g., the +y direction) thereof on the first mid-plate 231. Accordingly, the flexible display 220 coupled to the second housing 212 may also slide in the side-surface direction, so that a display area of the flexible display 220, which is exposed to the outside, is expanded or reduced.

In an embodiment, the second mid-plate 232 may be coupled to the rear surface of the first mid-plate 231 so as to support the second housing 212. In an example, the first housing 211 may be coupled to the rear surface of a second mid-plate 232.

In an embodiment, the drive part 250 may be connected, directly or indirectly, to the multi-bar 240 so as to cause the second housing 212 to slide. In an example, the drive part 250 may be provided in a bar shape and may rotate. In another example, the drive part 250 may guide sliding motion of the multi-bar 240 which is in contact with the outer circumferential surface of the drive part 250 according to the driving of an actuator (not shown) such as a motor, without rotational motion. The multi-bar 240, which is in contact with the outer circumferential surface of the drive part 250, may be bent and move with reference to the drive part 250.

Referring to FIG. 3, in case that the drive part 250 rotates in a first rotation direction (e.g., the counterclockwise direction) or guides the multi-bar 240 moving in the first rotation direction, the multi-bar 240 may be rolled into the inner direction of the electronic apparatus 101 along the outer circumferential surface of the drive part 250, and accordingly, a display area of the flexible display 220, which is exposed to the outside, may be reduced.

Referring to FIG. 4, in case that the drive part 250 rotates in a second rotation direction (e.g., the clockwise direction) opposite to the first rotation direction or guides the multi-bar 240 moving in the second rotation direction, the multi-bar 240 may be unrolled in the outer direction of the electronic apparatus 101 along the outer circumferential surface of the drive part 250, and accordingly, a display area of the flexible display 220, which is exposed to the outside, may be expanded.

In an embodiment, the first housing 211 and the second housing 212 may include a metal material. For example, at least a part of a side member included in the first housing 211 may be formed of metal and thus may be used as an antenna radiator (not shown). As an embodiment, a laser direct structuring (LDS) pattern may be formed on a part of the rear surface of the first housing 211 or on an antenna carrier, and the LDS pattern may be used as an antenna radiator.

As an embodiment, a wireless communication circuit (e.g., the communication module 190 in FIG. 1, comprising communication circuitry) may convert an intermediate frequency signal into a radio frequency (RF) signal (e.g., mmWave band signal) used in a first network (e.g., a legacy network) and/or a second network (e.g., a 5G network), during transmission. During reception, the radio communication circuit may pre-process the received RF signal (e.g., a mmWave band signal). For example, the radio communication circuit may convert an RF signal to an intermediate frequency signal.

As an embodiment, multiple radio frequency integrated circuits (RFICs) included in an antenna module may include multiple radio frequency front ends (RFFEs), and may convert an RF signal into an intermediate frequency signal or a baseband (BB) signal, during transmission. An intermediate frequency integrated circuit (IFIC) may be disposed, a signal output from a CP may be converted into an intermediate frequency (IF) signal in the IFIC, the intermediate frequency signal may be converted to an RF signal in the RFIC, and the RF signal may be radiated from the antenna. During reception, the RFIC may convert the received RF signal into an intermediate frequency signal and may transmit same to the IFIC, and the IFIC may convert the intermediate frequency signal into a baseband signal (BB) and may transmit same to the CP.

In an embodiment, the antenna module may include multiple RFICs.

In an embodiment, a first RFIC may convert a baseband signal generated by the CP into a first RF signal (e.g., an RF signal of about 700 MHz to about 3 GHZ) used in a first network (e.g., a legacy network). In an example, the first RFIC may obtain the first RF signal from the first network through the antenna module. The first RF signal may be pre-processed through a first RF front end. The first RFIC may convert the first RF signal into a baseband signal so that the pre-processed first RF signal is processed in the CP.

In an embodiment, a second RFIC may convert a baseband signal generated by the CP into a second RF signal (e.g., a sub-RF signal of a sub-6 band (about 6 GHz or less) used in a second network (e.g., a 5G network). In an example, the second RFIC may obtain the second RF signal from the second network through the antenna module. The second RF signal may be pre-processed through a second RF front end. The second RFIC may convert the second RF signal into a baseband signal so that the pre-processed second RF signal is processed in the CP.

In an embodiment, a third RFIC may convert a baseband signal generated by the CP into a third RF signal (e.g., an RF signal of Above6 band (about 6 GHz-about 60 GHz)) used in a third network (e.g., a 5G network). In an example, the third RFIC may obtain the third RF signal from the third network through the antenna module. The third RF signal may be pre-processed through a third RF front end. The third RFIC may convert the third RF signal into a baseband signal so that the pre-processed third RF signal is processed in the CP.

As an embodiment, an antenna module may be connected, directly or indirectly, to the printed circuit board 270 through a connection member (e.g., an FPCB). The connection member may be bent as the electronic apparatus 101 is switched between the first state 101a and the second state 101b, and may include a conductive line (e.g., signal wires and ground wires) for transmitting an RF signal. For Example, the connection member may include a connector including a conductive line, and the connector may include a coplanar waveguide (CPW) structure, a flexible printed circuit board type radio frequency cable (FRC), a coaxial cable, or a board to board (B-to-B) connector. One side of the connection member may be electrically connected, directly or indirectly, to the printed circuit board 270, and the other side of the connection member may be connected, directly or indirectly, to the antenna module. The antenna module may include multiple antenna modules for radiating a millimeter wave (mmWave).

Figure 5A:
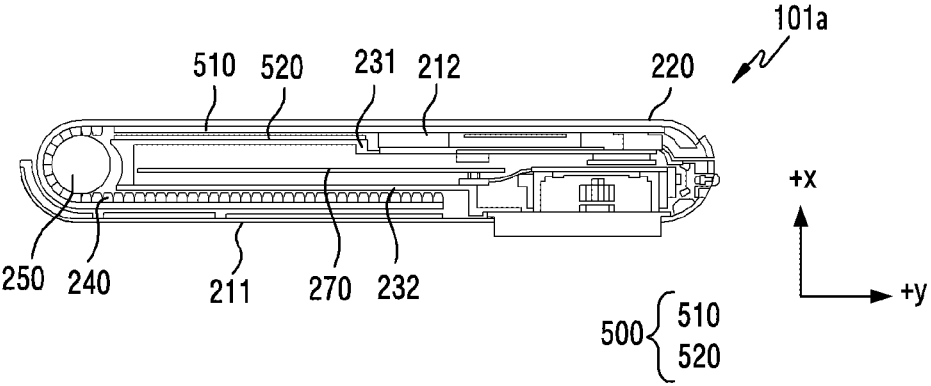
FIG. 5A shows the inside of an electronic apparatus including a first digitizer and a second digitizer in a first state according to an example embodiment.
Figure 5B:
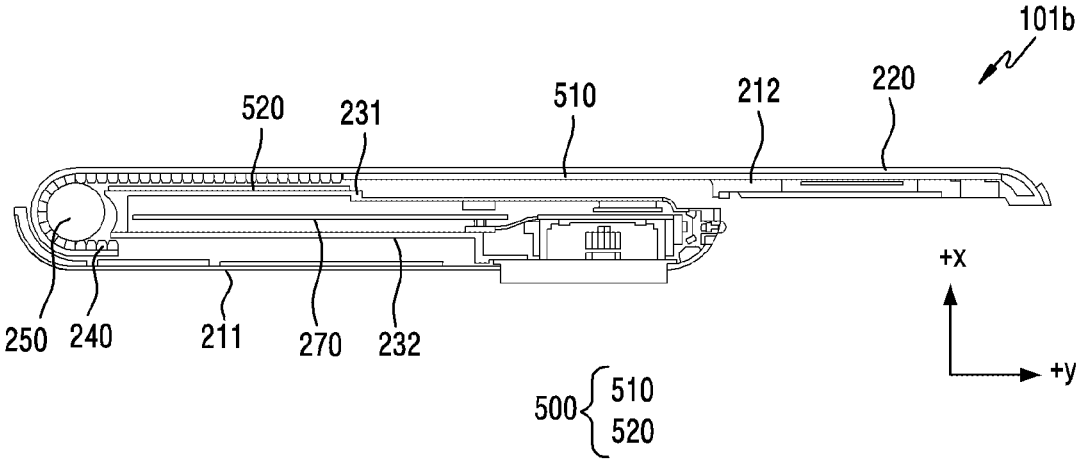
FIG. 5B shows the inside of an electronic apparatus including a first digitizer and a second digitizer in a second state according to an example embodiment.

FIG. 5A shows the inside of an electronic apparatus 101 including a first digitizer 510 and a second digitizer 520 in a first state 101a according to an embodiment. FIG. 5B shows the inside of an electronic apparatus 101 including a first digitizer 510 and a second digitizer 520 in a second state 101b according to an embodiment.

Referring to FIG. 5A and FIG. 5B, the electronic apparatus 101 may include the flexible display 220 and a digitizer 500.

In an embodiment, the electronic apparatus 101 may include a digitizer 500. In an example, the digitizer 500 may be a device capable of inputting an x-position and/or a y-position, and may detect a magnetic field type electronic pen. For example, a digitizer IC (e.g., the digitizer IC 1430 in FIG. 14) may provide a current to the digitizer 500, and the digitizer 500 may generate an electromagnetic field. In case that an electronic pen approaches the electromagnetic field of the digitizer 500, an electromagnetic induction phenomenon may occur, and thus a resonant circuit of the electronic pen may generate a current. The resonant circuit of the electronic pen may form a magnetic field by using the generated current. The digitizer IC may scan strength of the magnetic field applied from an electronic pen to a digitizer over the entire area and thus may detect the position thereof. The digitizer IC may provide the detected position to a processor (e.g., the processor 120 in FIG. 1), and the processor 120 may perform an operation corresponding thereto.

In an embodiment, the digitizer 500 may be disposed to correspond to the entire area of the flexible display 220. In an example, the digitizer 500 may include multiple digitizers. In an example, the digitizer 500 may include the first digitizer 510 and the second digitizer 520.

In an embodiment, the digitizer 500 may be disposed at a position adjacent to, directly or indirectly, the flexible display 220. In an example, the first digitizer 510 may be coupled to the rear surface (e.g., in the −x direction) of the first area 221 of the flexible display 220 or may be disposed at a position adjacent thereto. In an example, the second digitizer 520 may be disposed to correspond to the second area 222 of the flexible display 220. In an example, the second digitizer 520 may be disposed to correspond to the second area 222 of the flexible display 220 in the second state 101b of the electronic apparatus 101. For example, the second digitizer 520 may be disposed on, directly or indirectly, a first surface (e.g., the surface disposed in the +x direction) of the first mid-plate 231. That is, the second digitizer 520 may detect a signal by an electronic pen and/or a part of a human body to the second area 222 of the flexible display 220 in the second state 101b of the electronic apparatus 101.

In an embodiment, in order to prevent or reduce electromagnetic interference on the digitizer 500, a shielding layer (e.g., the first shielding layer 630 and/or the second shielding layer 660 in FIG. 6 described later) may be disposed on the rear surface (e.g., in the −x direction) of the digitizer 500.

FIG. 6 is a view showing a structure of a display module 605 according to an embodiment.

Referring to FIG. 6, a display module 605 of the electronic apparatus 101 according to an example embodiment may include the flexible display 220, the first digitizer (digitizer 1) 510, the first shielding layer (shielding layer 1) 630, the height compensation layer 640, the second digitizer (digitizer 2) 520, and the second shielding layer (shielding layer 2) 660. The flexible display 220 may include a touch layer (or a touch panel). In an embodiment, the touch layer (or touch panel) may include various types of touch panels. For example, various types of touch panels, such as a capacitance-type touch panel for detecting a change in capacitance, a pressing-type touch panel for detecting a pressure acting on a panel to detect the position thereof, an optical-type touch panel using infrared rays, a transparent electrode-type touch panel using the contact point of a transparent conductive film, or an electromagnetic resonance (EMR)-type touch panel, may be used.

In an embodiment, the first digitizer 510 may be disposed on, directly or indirectly, the lower part of the flexible display 220. For example, in case that a touch panel is used as a digitizer panel, the touch panel may include a pattern layer on which a transmission pattern (e.g., TX pattern) is formed and a pattern layer on which a reception pattern (e.g., RX pattern) is formed, and the transmission pattern layer and the reception pattern layer may be mutually stacked to perform a function for generating/detecting an electromagnetic field. According to an embodiment, a magnetic field generated from an electromagnetic inductor (an input device, for example a stylus pen) may be detected through an EMR method by using a digitizer panel, and various motions such as the click, drag, approach of the electromagnetic inductor may be detected.

In an embodiment, the first shielding layer 630 may be disposed on the lower part of the first digitizer 510 in order to prevent or reduce electromagnetic interference on the first digitizer 510. For example, the first shielding layer 630 may be a magnetic metal powder (MMP) applied on the lower part of the first digitizer 510. The electronic apparatus 101, by using the first shielding layer 630, may shield a magnetic force of components (e.g., other electronic components inside the first housing 211 and/or the second housing 212) therearound, which may be recognized as noise and is other than signals input from a stylus pen.

In an embodiment, the second digitizer 520 may be disposed under the first shielding layer 630. The second shielding layer 660 may be disposed on the lower part of the second digitizer 520 in order to prevent or reduce electromagnetic interference on the second digitizer 520. In an embodiment, the height compensation layer 640 may be an adhesive material or sponge and may be formed to have a predetermined thickness. The height compensation layer 640 may be disposed at one side of the first digitizer 510 and/or the first shielding layer 630. A thickness h3, which is the sum of a thickness h1 (e.g., about 80 μm-100 μm) of the first digitizer 510 and a thickness h2 (e.g., about 20 μm-30 μm) of the first shielding layer 630, may be substantially the same as the thickness h3 (e.g., about 100 μm-130 μm) of the height compensation layer 640.

In an embodiment, a protective layer (not shown) may be disposed under the first shielding layer 630. For example, the protective layer may be disposed in an area of the lower area of the first shielding layer 630, which is other than an area overlapping the second digitizer 520. For example, the protective layer may be configured by any one of at least one adhesive layer, at least one cushion layer, and at least one heat dissipation layer, or a combination of at least two of the at least one adhesive layer, the at least one cushion layer, and the at least one heat dissipation layer. For example, the at least one cushion layer may be a configuration having an embossed pattern (embo-pattern) formed thereon to absorb a physical impact acting on the panel. The at least one heat dissipation layer may be a configuration capable of dissipating heat generated in the flexible display 220 to the outside, and at least a part thereof may include a metal material (e.g., graphite or a copper (Cu) foil).

In another embodiment, the first shielding layer 630 and/or the protective layer may be formed to have substantially the same area as a first area 601 (e.g., the first area 221 in FIG. 2B) of the flexible display 220, and may be disposed on the rear surface of the flexible display 220. In addition, in an embodiment, the second shielding layer 660 may be formed to have substantially the same area as a second area 602 (e.g., the second area 222 in FIG. 2B), and may be disposed in at least a part (e.g., the groove 671 in FIG. 9A) of a housing (e.g., the housing 670 in FIG. 9A and FIG. 9B). In an example, the first digitizer 510 may be formed to have substantially the same area as the first area 601 of the flexible display 220, and may be disposed on the rear surface of the flexible display 220. In an example, the second digitizer 520 may be formed to have substantially the same area as the second area 602 of the flexible display 220 or formed to have an area larger than the second area 602, and may be disposed in a housing (e.g., on the first mid-plate 231 in FIG. 3).

In an embodiment, the flexible display 220 may include the first area 601 which is visible in the first state 101a and a second area 602 which is visible in the second state 101b.

In an embodiment, the first digitizer 510 may be disposed to detect an input by a stylus pen (e.g., an EMR pen) in the first area 601 of the flexible display 220. As an example, the first digitizer 510 may be disposed to correspond to the first area 601. In an example, the first digitizer 510 may be attached to the first area 601 of the flexible display 220. The second digitizer 520 may be disposed to detect an input by a stylus pen in the second area 602 of the flexible display 220. In case that a screen of the flexible display 220 is expanded, the second digitizer 520 may be disposed to correspond to the second area 602. The second digitizer 520 may be mounted in a housing (e.g., in the housing 670 in FIG. 7 or on the first mid-plate 231 in FIG. 3).

Figure 7:
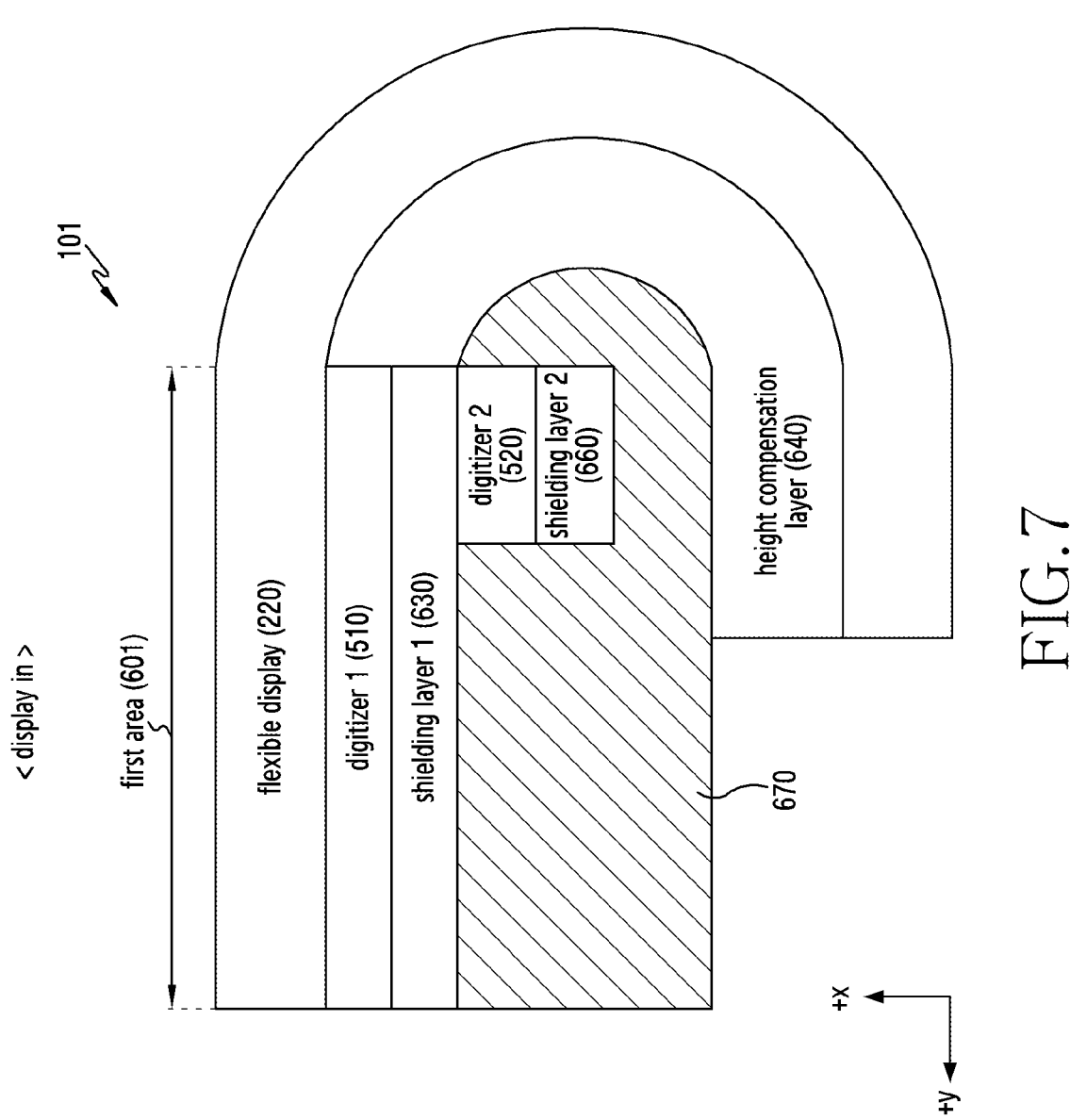
FIG. 7 is a view showing an arrangement structure of a first digitizer and a second digitizer in a first state of an electronic apparatus according to various example embodiments.
Figure 8:
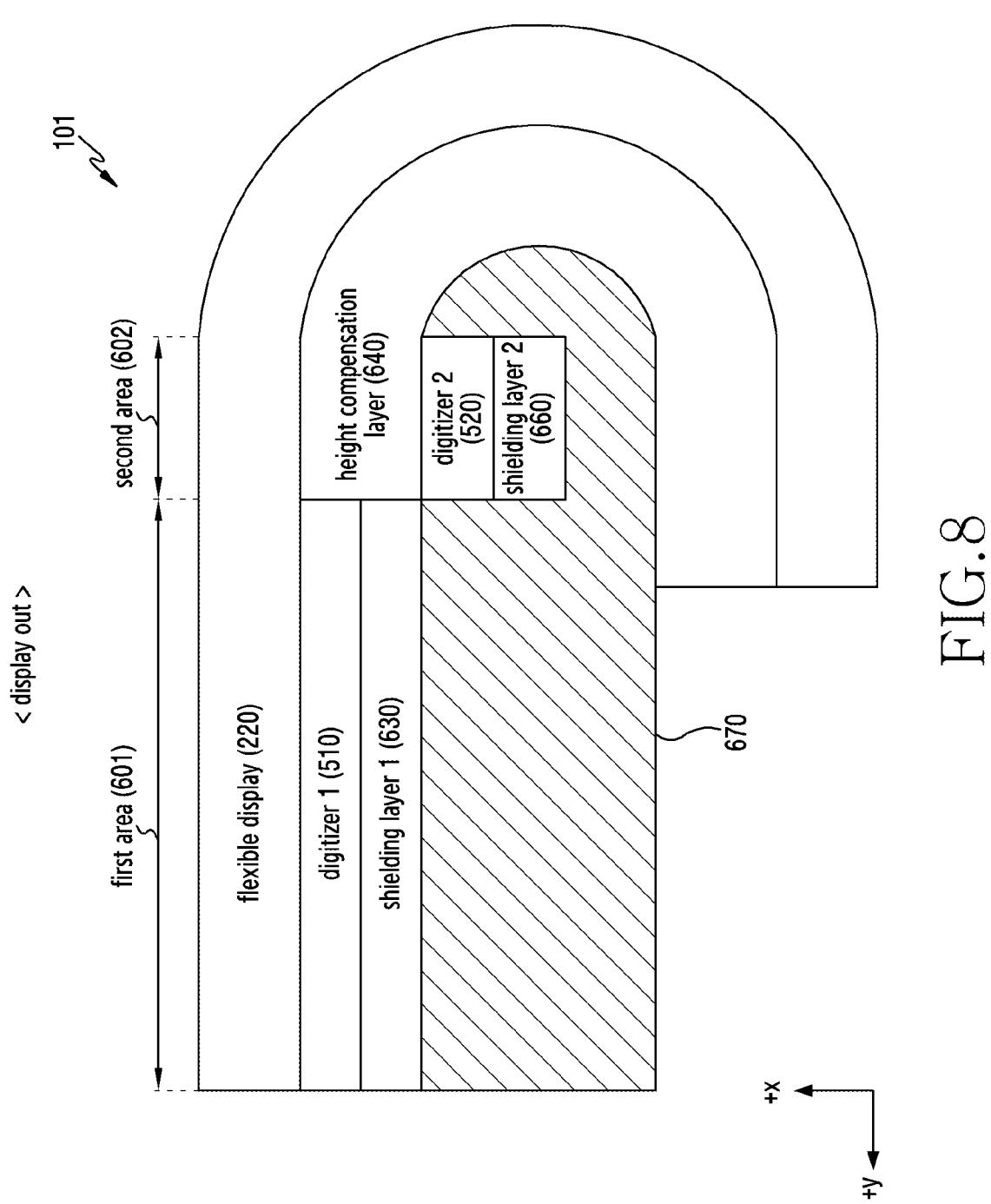
FIG. 8 is a view showing an arrangement structure of a first digitizer and a second digitizer in a second state of an electronic apparatus according to various example embodiments.

FIG. 7 is a view showing an arrangement structure of a first digitizer 510 and a second digitizer 520 in a first state 101a of an electronic apparatus 101 according to various embodiments. FIG. 8 is a view showing an arrangement structure of a first digitizer 510 and a second digitizer 520 in a second state 101b of an electronic apparatus 101 according to various embodiments.

Referring to FIG. 7 and FIG. 8, in case that the electronic apparatus 101 is in the first state 101a, the first digitizer 510 may detect an input by a stylus pen in the first area 601 of the flexible display 220. As an example, in case that the electronic apparatus 101 is in the first state 101a, the first digitizer 510 may operate and the second digitizer 520 may not operate.

In an embodiment, in case that the electronic apparatus 101 is in the second state 101b, the flexible display 220 may slide in the first direction (e.g., the +y-axis direction), so that at least a part of the second area 222 of the flexible display 220, which has been inserted in the electronic apparatus 101, may be withdrawn therefrom. At least a part of the second digitizer 520 may be disposed to correspond to the second area 602. For example, the first digitizer 510 may be moved in the first direction (e.g., the +y-axis direction) together with the flexible display 220, and thus at least a part thereof may be disposed to correspond to the first area 601. As the first digitizer 510 moves in the first direction (e.g., the +y-axis direction) together with the flexible display 220, the height compensation layer 640 may move in the first direction (e.g., the +y-axis direction). For example, in case that the electronic apparatus 101 is in the second state 101b, the second digitizer 520 may be positioned under the height compensation layer 640. As an example, in case that the electronic apparatus 101 is in a state where a display slides out (e.g., a screen is expanded), the first digitizer 510 and the second digitizer 520 may operate. The first digitizer 510 may detect an input by a stylus pen in the first area 601. In addition, the second digitizer 520 may detect an input by a stylus pen in the second area 602.

In an embodiment, as the electronic apparatus 101 is switched from the first state 101a to the second state 101b, the second housing 212 slides and accordingly, the first digitizer 510 may move. Therefore, at least a part of the first digitizer 510 may overlap the second digitizer 520. In an example, the first digitizer 510 may not overlap the second digitizer 520 in the second state 101b. In another example, the first digitizer 510 may overlap the second digitizer 520 in an area smaller than an area overlapping the second digitizer 520 in the first state 101a.

Figure 9A:
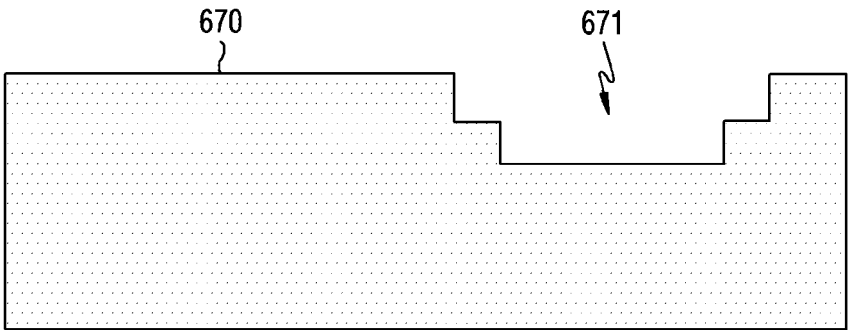
FIG. 9A is a view showing an example of a mounting structure of a second digitizer according to various example embodiments.
Figure 9B:
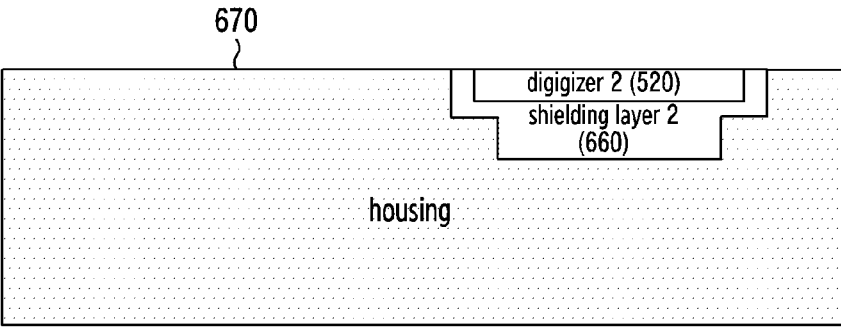
FIG. 9B is a view showing an example of a mounting structure of a second digitizer according to various example embodiments.

FIG. 9A and FIG. 9B are views showing an example of a mounting structure of a second digitizer 520.

Referring to FIG. 9A and FIG. 9B, the electronic apparatus 101 may be configured such that the first digitizer 510 moves together with the first area 221 of the flexible display 220, and the second digitizer 520 does not move, as a screen is reduced and a screen is expanded. As an example, the first digitizer 510 may be attached to the rear surface (e.g., in the −x direction) of the flexible display 220 and thus may move together therewith when the second housing 212 moves.

In an embodiment, as an example, in the second digitizer 520, the second digitizer 520 and the second shielding layer 660 may be mounted in a groove 671 formed to have a predetermined depth on a housing 670. In an example, the housing 670 may correspond to the first mid-plate 231 in FIG. 2C. In an example, the housing 670 may be made of metal. The second shielding layer 660 may be disposed to cover the lower surface and side surfaces of the second digitizer 520, so that the second digitizer is not affected by magnetism in case that the second digitizer 520 is mounted in the housing 670. The second digitizer 520 may be mounted in the groove 671 of the housing 670, and thus the second digitizer 520 may be fixed without moving in case that the flexible display 220 moves according to screen expansion (e.g., display expansion).

Figure 10:
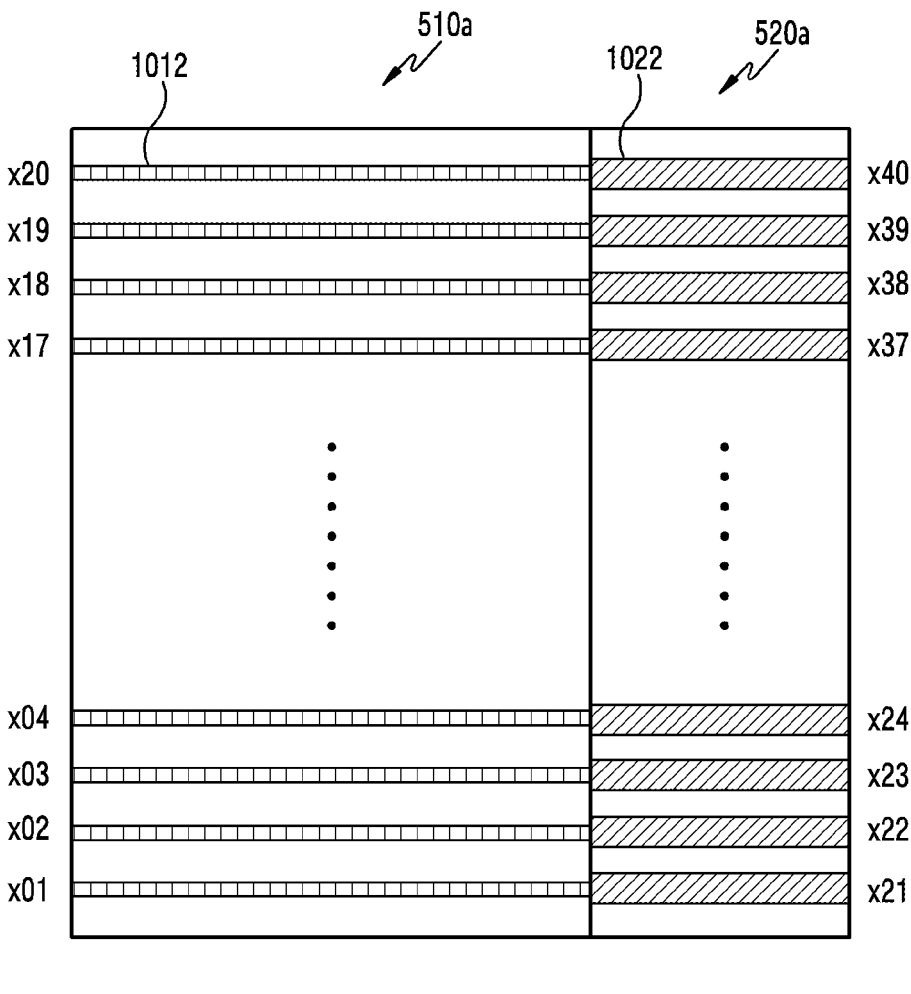
FIG. 10 is a view showing an example of first axis wires (e.g., X-axis wires) of a first digitizer and a second digitizer according to various example embodiments.
Figure 11:
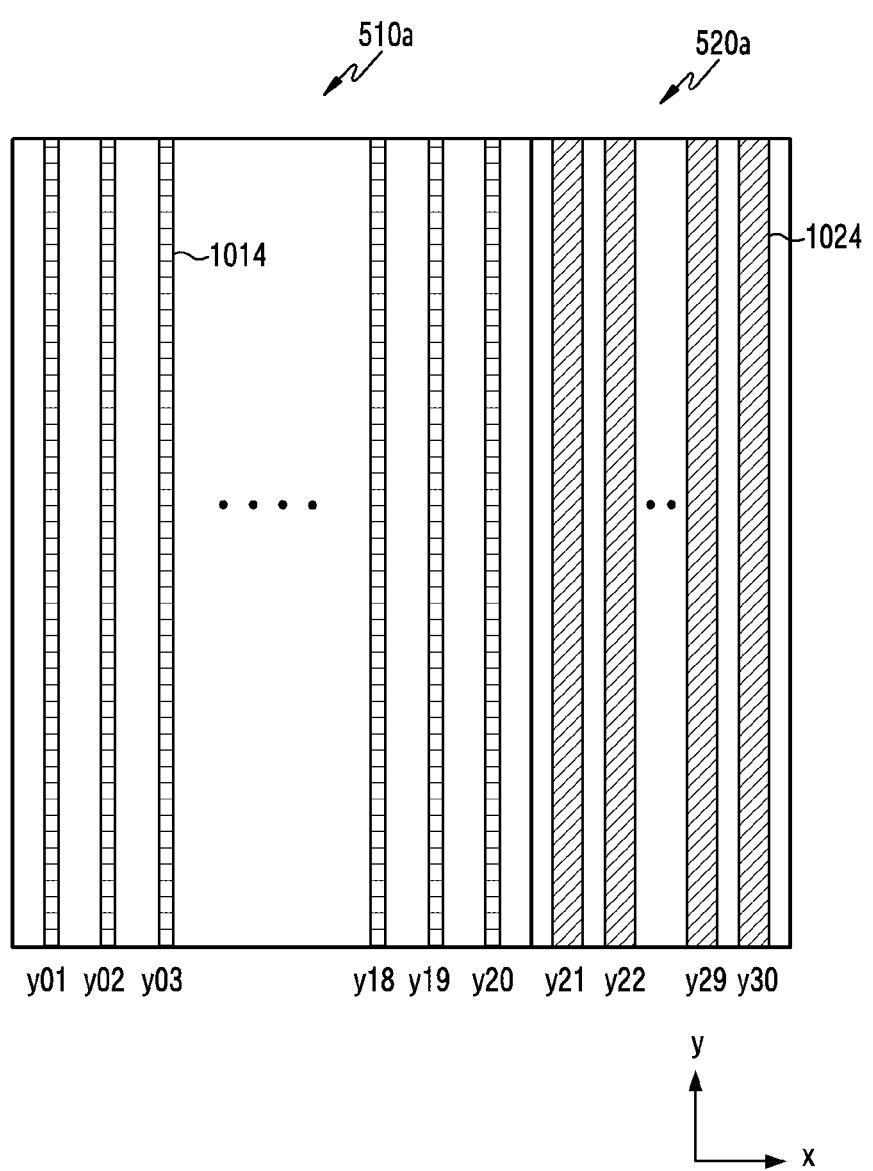
FIG. 11 is a view showing an example of second axis wires (e.g., Y-axis wires) of a first digitizer and a second digitizer according to various example embodiments.

FIG. 10 is a view showing an example of first axis wires (e.g., X-axis wires) of a first digitizer 510a and a second digitizer 520b according to various embodiments. FIG. 11 is a view showing an example of second axis wires (e.g., Y-axis wires) of a first digitizer 510a and a second digitizer 520b according to various embodiments.

Referring to FIG. 10 and FIG. 11, a first digitizer 510a may include multiple first sensing patterns 1012 formed in the first direction (e.g., the x-axis direction) and multiple second sensing patterns 1014 formed in the second direction (e.g., the y-axis direction). Here, the first direction and the second direction may be substantially orthogonal to each other.

In an embodiment, the second digitizer 520b may include multiple third sensing patterns 1022 formed in the first direction and multiple fourth sensing patterns 1024 formed in the second direction. Here, the first direction and the second direction may be substantially orthogonal to each other.

In an embodiment, the first digitizer 510a and the second digitizer 520a may be positioned at heights different from each other. Accordingly, there may be a difference between a first distance between the first digitizer 510a and the surface of the flexible display 220 and a second distance between the second digitizer 520a and the surface of the flexible display 220. In case that the second digitizer 520a is positioned farther from the surface of the flexible display 220 than the first digitizer 510a, sensing sensitivity of the second digitizer 520a may be lowered.

As an example, in order to prevent or reduce a difference in sensing sensitivity between the first digitizer 510a and the second digitizer 520a, the sensing patterns 1012 and 1014 of the first digitizer 510a and the sensing patterns 1022 and 1024 of the second digitizer 520a may be configured differently.

As an example, the first sensing patterns 1012 and the second sensing patterns 1014 of the first digitizer 510a may be formed to have a first width. The third sensing patterns 1022 and the fourth sensing patterns 1024 of the second digitizer 520a may be formed to have a second width wider than the first width. As described above, the width of the sensing patterns 1022 and 1024 of the second digitizer 520a may be formed to be wider than the width of the sensing patterns 1012 and 1014 of the first digitizer 1010 so as to prevent or reduce a difference in sensing sensitivity therebetween in case that the first digitizer 1010 and the second digitizer 1020 are driven.

As an example, the width of the sensing patterns 1022 and 1024 of the second digitizer 520a may be formed to be wider than the width of the sensing patterns 1012 and 1014 of the first digitizer 510a. In an example, a digitizer drive IC (e.g., the digitizer drive IC 1430 in FIG. 14) may be configured such that the sensing sensitivity of the second digitizer 520b is set to be higher than the sensing sensitivity of the first digitizer 510a. Through this, in case that the first digitizer 510a and the second digitizer 520a are driven, a difference in sensing sensitivity therebetween may be prevented or reduced.

Figure 12:
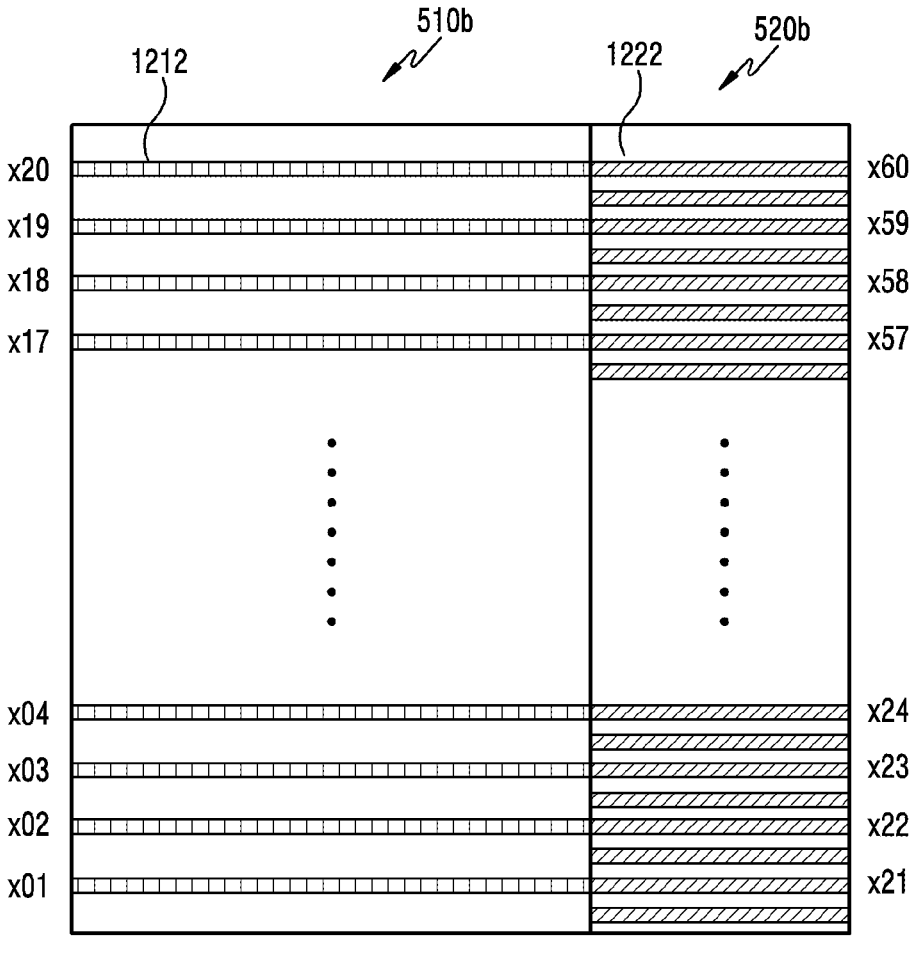
FIG. 12 is a view showing an example of first axis wires (e.g., X-axis wires) of a first digitizer and a second digitizer according to various example embodiments.
Figure 12:
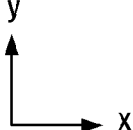
Figure 13:
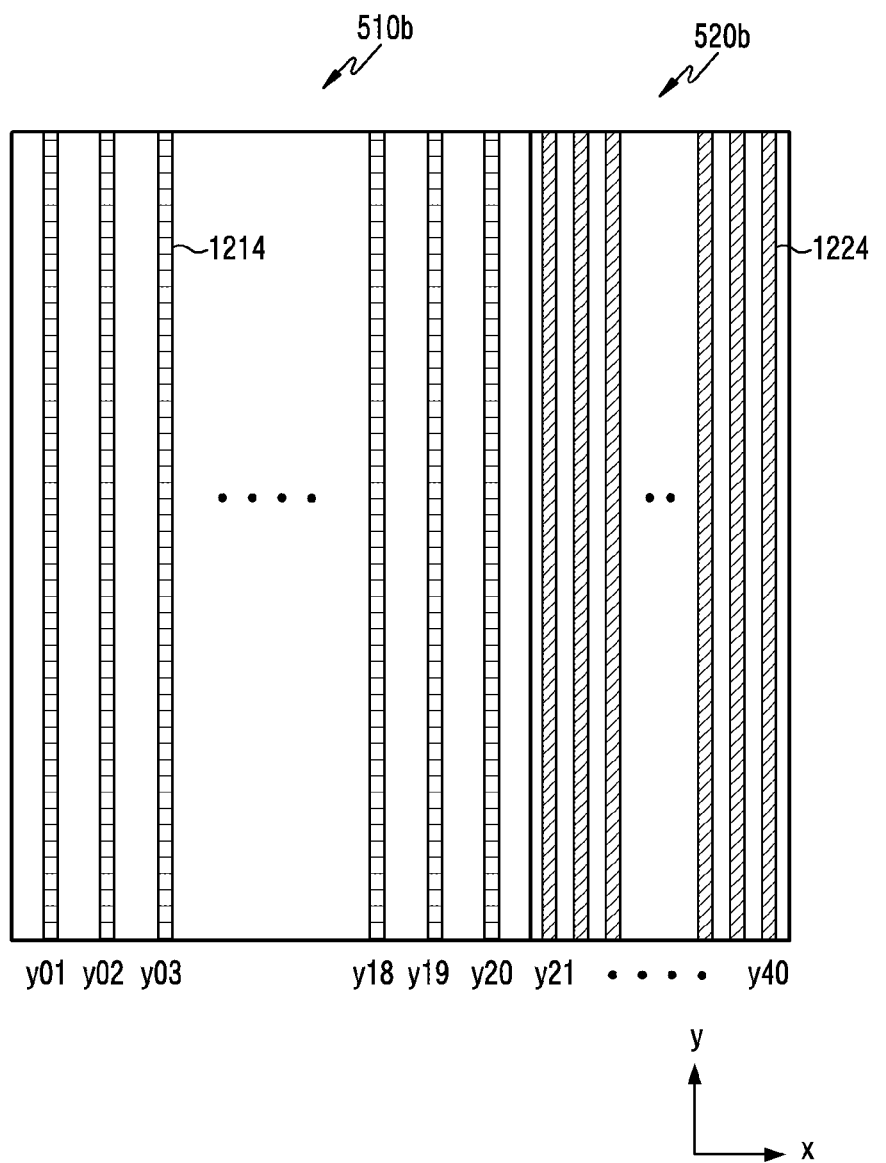
FIG. 13 is a view showing an example of second axis wires (e.g., Y-axis wires) of a first digitizer and a second digitizer according to various example embodiments.

FIG. 12 is a view showing an example of first axis wires (e.g., X-axis wires) of a first digitizer 510b and a second digitizer 520b according to various embodiments. FIG. 13 is a view showing an example of second axis wires (e.g., Y-axis wires) of a first digitizer 510b and a second digitizer 520b according to various embodiments.

Referring to FIG. 12 and FIG. 13, a first digitizer 510b may include multiple first sensing patterns 1212 formed in the first direction (e.g., the x-axis direction) and multiple second sensing patterns 1214 formed in the second direction (e.g., the y-axis direction). Here, the first direction and the second direction may be substantially orthogonal to each other.

In an embodiment, the second digitizer 520b may include multiple third sensing patterns 1222 formed in the first direction and multiple fourth sensing patterns 1224 formed in the second direction. Here, the first direction and the second direction may be substantially orthogonal to each other.

In an embodiment, the first digitizer 510b and the second digitizer 520b may be positioned at heights different from each other. For example, there may be a difference between a first distance between the first digitizer 510b and the surface of the flexible display 220 and a second distance between the second digitizer 520b and the surface of the flexible display 220. In case that the second digitizer 520b is positioned farther from the surface of the flexible display 220 than the first digitizer 510b, sensing sensitivity of the second digitizer 520b may be lowered.

As an example, in order to prevent or reduce a difference in sensing sensitivity between the first digitizer 510b and the second digitizer 520b, the sensing patterns 1212 and 1214 of the first digitizer 510b and the sensing patterns 1222 and 1224 of the second digitizer 520b may be configured differently.

As an example, the first sensing patterns 1212 of the first digitizer 510b may be formed to have a first interval, and the second sensing patterns 1214 may be formed to have the first interval. The third sensing patterns 1222 of the second digitizer 520b may be formed to have a second interval narrower than the first interval, and the fourth sensing patterns 1224 may be formed to have a second interval narrower than the first interval. The interval between the sensing patterns 1222 and 1224 of the second digitizer 520b may be formed to be narrower than the interval between the sensing patterns 1212 and 1214 of the first digitizer 510b, and thus based on the same area, the sensing patterns 1222 and 1224 of the second digitizer 520b may be arranged to have a number greater than the sensing patterns 1212 and 1214 of the first digitizer 510b.

In an embodiment, the interval of the sensing patterns 1222 and 1224 of the second digitizer 520b may be formed to be narrower than the interval of the sensing patterns 1212 and 1214 of the first digitizer 510b so as to prevent or reduce a difference in sensing sensitivity therebetween in case that the first digitizer 510b and the second digitizer 520b are driven. In an embodiment, in addition to making the interval of the sensing patterns 1222 and 1224 of the second digitizer 520b narrower than the interval of the sensing patterns 1212 and 1214 of the first digitizer 510b, a digitizer drive IC (e.g., the digitizer drive IC 1430 in FIG. 14) may be configured such that the second digitizer 520b is set to have sensing sensitivity higher than the first digitizer 510b. Through this, in case that the first digitizer 510b and the second digitizer 520b are driven, a difference in sensing sensitivity therebetween may be prevented or reduced.

Figure 14:
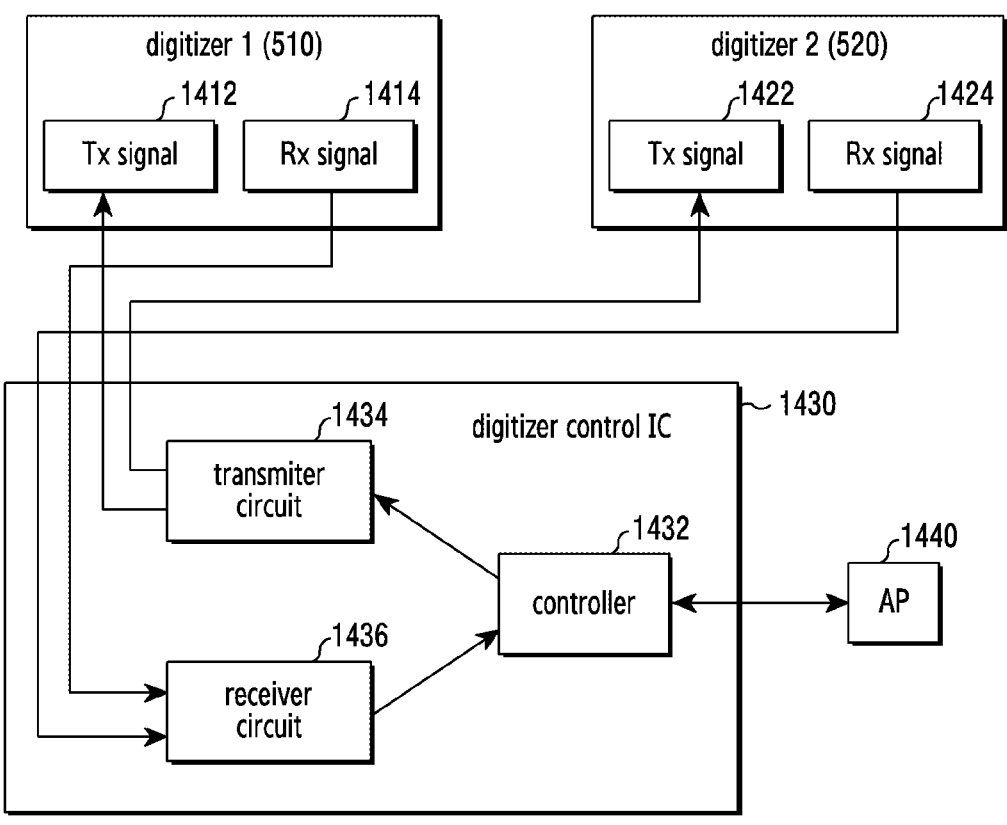
FIG. 14 is a view showing a digitizer drive IC for driving a first digitizer and a second digitizer according to various example embodiments.

FIG. 14 is a view showing a digitizer drive IC 1430 for driving a first digitizer (digitizer 1) 510 and a second digitizer (digitizer 2) 520.

Referring to FIG. 14, the first digitizer 510 may include a transmission terminal 1412 for transmitting a TX signal and a reception terminal 1414 for receiving an RX signal. The second digitizer 520 may include a transmission terminal 1422 for transmitting a TX signal and a reception terminal 1424 for receiving an RX signal.

As an example, the transmission terminal 1412 of the first digitizer 510 may be first sensing patterns (e.g., the first sensing patterns 1012 in FIG. 10). The reception terminal 1414 of the first digitizer 510 may be second sensing patterns (e.g., the second sensing patterns 1014 in FIG. 11). However, not limited thereto, the transmission terminal 1412 of the first digitizer 510 may be second sensing patterns (e.g., the second sensing patterns 1014 in FIG. 11) of the first digitizer 510, and the reception terminal 1414 of the first digitizer 510 may be first sensing patterns (e.g., the first sensing patterns 1012 in FIG. 10). As an example, the first sensing patterns 1212 and the second sensing patterns 1214 of the first digitizer 510b in FIG. 12 and FIG. 13 may be applied the same as the first sensing patterns 1012 and the second sensing patterns 1014.

As an example, the transmission terminal 1422 of the second digitizer 520 may have third sensing patterns (e.g., the third sensing patterns 1022 in FIG. 10). The reception terminal 1424 of the second digitizer 520 may be fourth sensing patterns (e.g., the fourth sensing patterns 1024 in FIG. 11). However, not limited thereto, the transmission terminal 1422 of the second digitizer 520 may be fourth sensing patterns (e.g., the fourth sensing patterns 1024 in FIG. 11). The reception terminal 1424 of the second digitizer

520 may be third sensing patterns (e.g., the third sensing patterns 1022 in FIG. 10). As an example, the third sensing patterns 1222 and the fourth sensing patterns 1224 of the second digitizer 520_b_ in FIG. 12 and FIG. 13 may be applied the same as the third sensing patterns 1022 and the fourth sensing patterns 1024.

In an embodiment, the first digitizer 510 may operate in both a slide-in state of a display (e.g., a reduction state of a screen) and a slide-out state of a display (e.g., an expansion state of a screen). The second digitizer 520 may not operate in a slide-in state of a display (e.g., a reduction state of a screen), and may operate only in a slide-out state of a display (e.g., an expansion state of a screen).

In an embodiment, the digitizer drive IC 1430 may be electrically connected, directly or indirectly, to an application processor 1440, and thus may be driven according to a control of the application processor 1440. The digitizer drive IC 1430 may include a controller 1432, a transmitter circuit 1434, and a receiver circuit 1436. The controller 1432 may control the driving of the transmitter circuit 1434 and the receiver circuit 1436.

In an embodiment, the transmitter circuit 1434 may be electrically connected, directly or indirectly, to the transmission terminal 1412 of the first digitizer 510 and the transmission terminal 1422 of the second digitizer 520 so as to output a transmission signal for sensing. The receiver circuit 1436 may be electrically connected, directly or indirectly, to the reception terminal 1414 of the first digitizer 510 and the reception terminal 1424 of the second digitizer 520 so as to receive a reception signal for sensing. The digitizer drive IC 1430 may transmit a first digitizer reception signal and a second digitizer reception signal received from the reception terminal 1414 of the first digitizer 510 to the application 1440. As an example, the digitizer drive IC 1430 may be configured such that the second digitizer 520 is set to have sensing sensitivity higher than the first digitizer 510 so as to prevent or reduce a difference in sensing sensitivity between the first digitizer 510 and the second digitizer 520.

Figure 15:
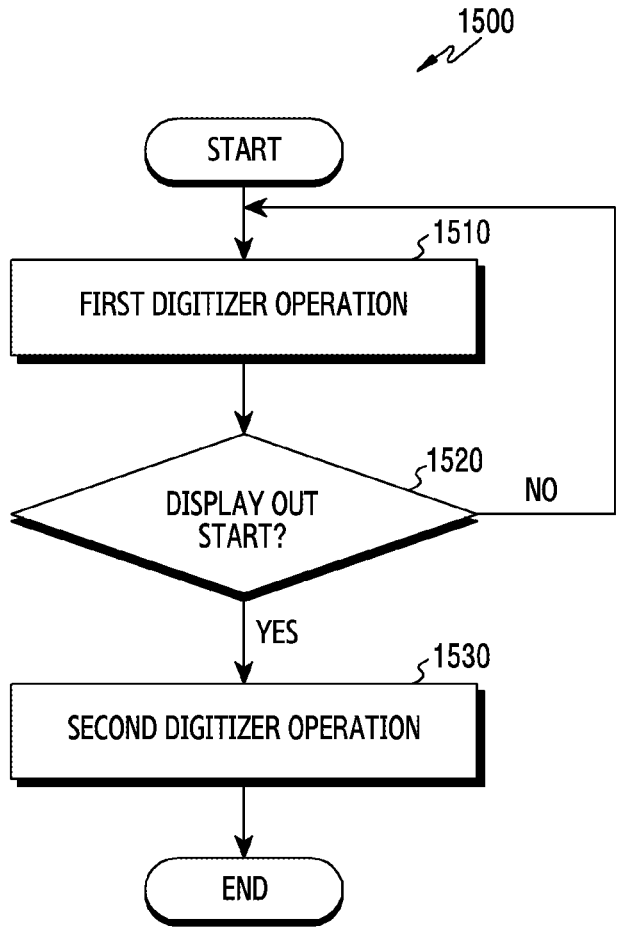
FIG. 15 is a flowchart showing a method for operating a digitizer of an electronic apparatus according to an example embodiment.

FIG. 15 is a flowchart 1500 showing a method for operating a digitizer of an electronic apparatus 101 according to an embodiment.

Referring to FIG. 14 and FIG. 15, in operation 1510, the first digitizer 510 may operate in a slide-in state of a display (e.g., a reduction state of a screen).

In operation 1520, the electronic apparatus may detect a slide-out state of a display (e.g., an expansion state of a screen). In an embodiment, the electronic apparatus may identify a state (e.g., a slide-in or -out state) of a display, based on information obtained through a sensor module (e.g., the sensor module 176 in FIG. 1 including at least one sensor). For example, the electronic apparatus may identify a state of a display by using data obtained by at least one of a Hall sensor, an angle encoder, a stretch sensor, a proximity sensor, an acceleration sensor, a gyro sensor (e.g., a gyroscope), a geomagnetic sensor, and a rotary sensor.

As a result of operation 1520, in case that a display is not in a slide-out state (e.g., a screen is not in an expanded state) (No in operation 1520), the first digitizer 510 may operate and the second digitizer 520 may not operate.

As a result of operation 1520, in case that a display is in a slide-out state (e.g., a screen is in an expanded state) (Yes in operation 1520), in operation 1530, the second digitizer 520 may operate. In addition, the first digitizer 510 may operate even in a slide-out state of a display (e.g., an expansion state of a screen).

As an example, an operation of the second digitizer 520 may start together with the start of a slide-in of a display (e.g., expansion of a screen).

As an example, in case that a display has been slid out (e.g., a screen has been expanded), an operation of the second digitizer 520 may be started.

Figure 16:
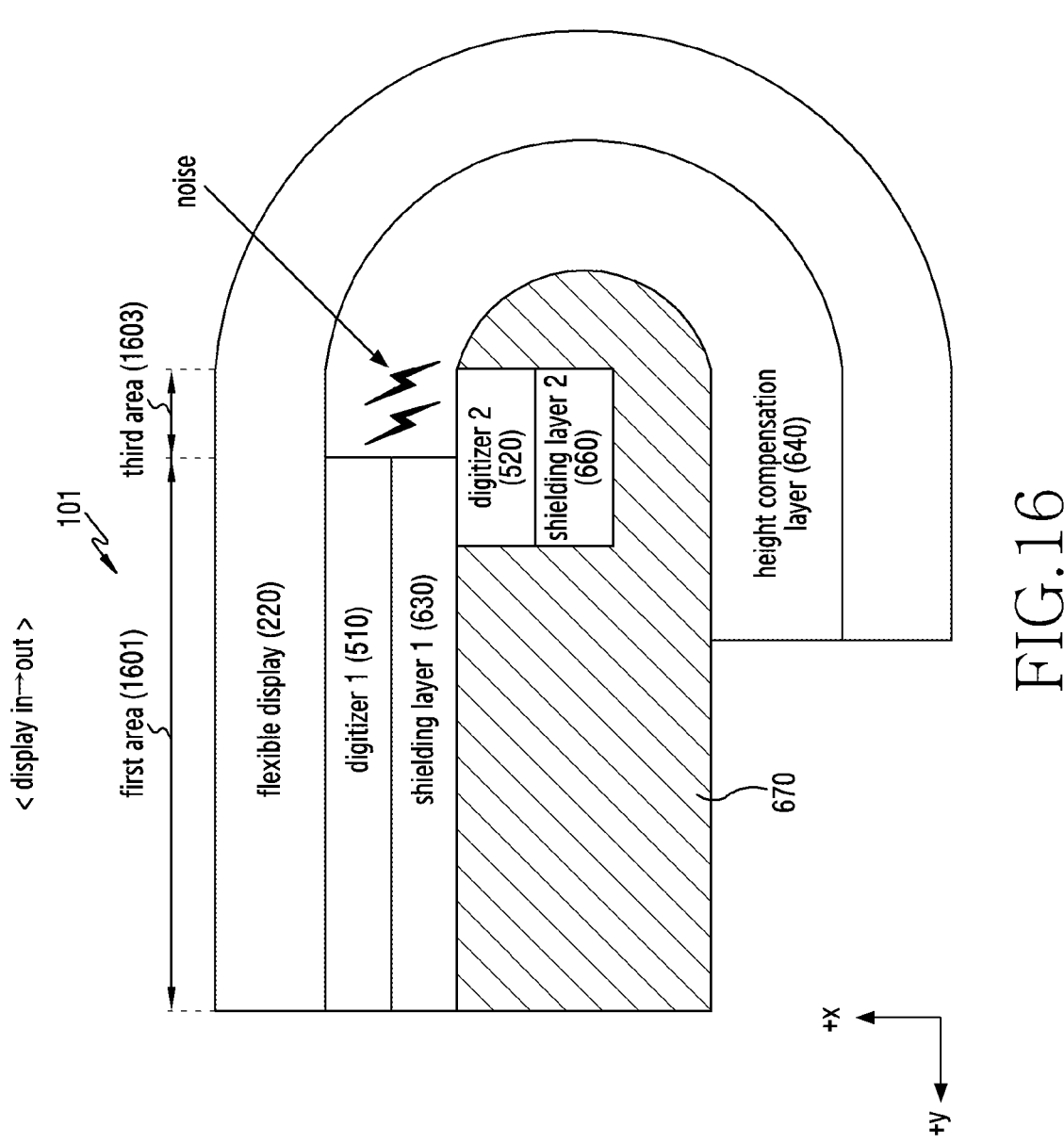
FIG. 16 shows a first area and a third area of a flexible display according to an example embodiment.

FIG. 16 shows a first area 1601 and a third area 1603 of a flexible display 220 according to an embodiment.

Figure 17:
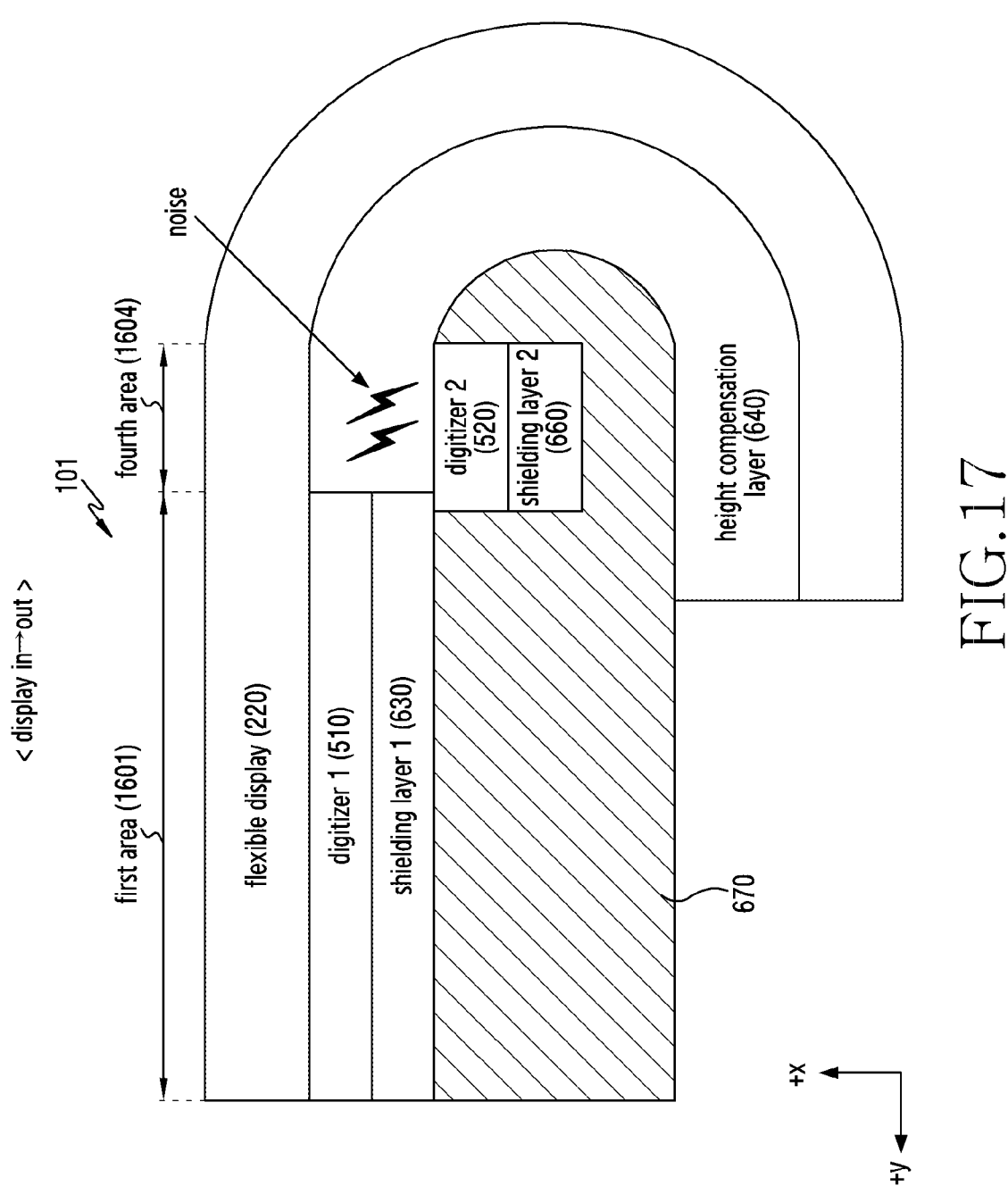
FIG. 17 shows a first area and a fourth area of a flexible display according to an example embodiment.

FIG. 17 shows a first area 1601 and a fourth area 1604 of a flexible display 220 according to an embodiment.

In an embodiment, in case that the electronic apparatus 101 is in the first state 101_a_, a first area 1601 of the flexible display 220 may be visible to the outside.

In an embodiment, in case that the electronic apparatus 101 is changed from the first state 101_a_ to the second state 101_b_, the flexible display 220 may not slide fully. For example, the movement of the flexible display 220 may freely stop at an intermediate point while the flexible display does not move by a predetermined distance so that a display becomes a slide-out state (e.g., a screen becomes an expansion state). In this case, the third area 1603 of the flexible display 220 as illustrated in FIG. 16 or the fourth area 1604 of the flexible display 220 as illustrated in FIG. 17 may be formed.

As an example, an operation of the second digitizer 520 may start together with the start of a slide-in of a display (e.g., expansion of a screen).

As an example, in case that a display has been slid out (e.g., a screen has been expanded), an operation of the second digitizer 520 may be started.

In case that the third area 1603 of the flexible display 220 or the fourth area 1604 of the flexible display 220 is formed, the first digitizer 510 and the second digitizer 520 may partially overlap each other. In case that an operation of the second digitizer 520 starts together with the start of a slide-out of a display (e.g., expansion of a screen), both the first digitizer 510 and the second digitizer 520 may be operated.

In an embodiment, an area, in which sensing patterns (e.g., the sensing patterns 1012 and 1014 in FIG. 10 and FIG. 11) of the first digitizer 510 overlap sensing patterns (e.g., the sensing patterns 1022 and 1024 in FIG. 10 and FIG. 11) of the second digitizer 520, may be generated. In an example, noise may be generated by a magnetic field generated from an electromagnetic inductor in an area in which the first digitizer 510 and the second digitizer 520 overlap each other. Due to the noise, the sensing sensitivity of the first digitizer 510 and second digitizer 520 may be lowered, and interference in the touch sensing of the flexible display 220 may also be caused.

Figure 18:
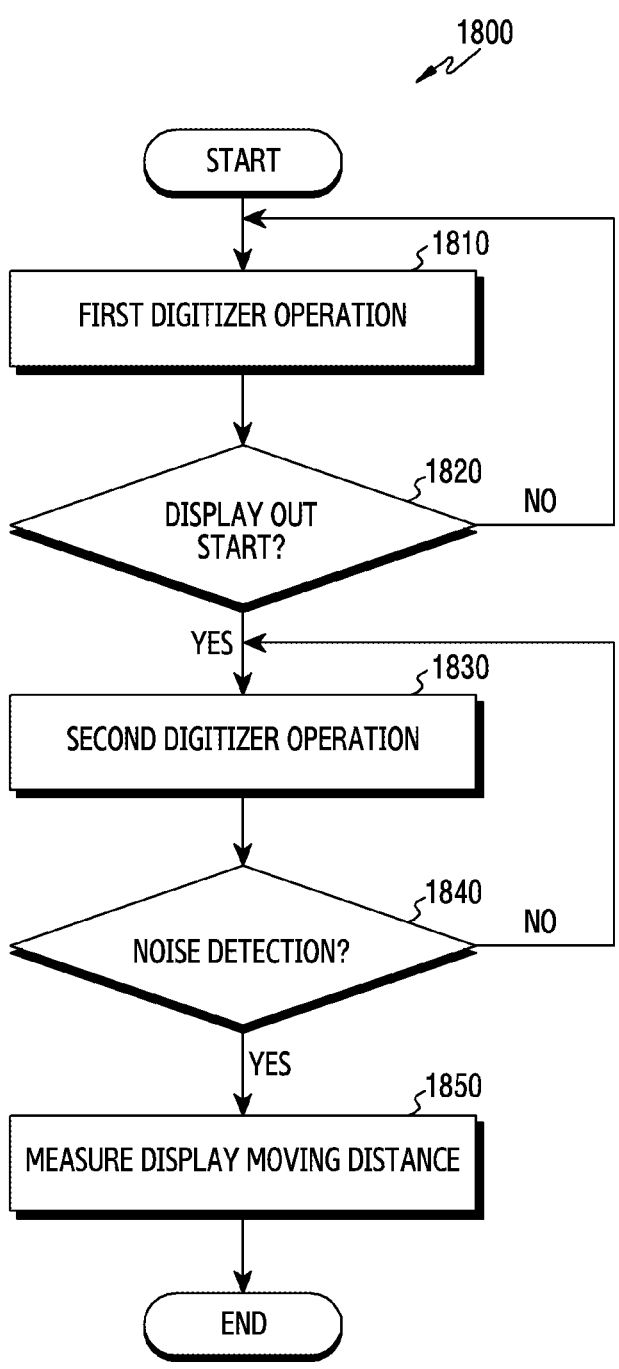
FIG. 18 is a flowchart showing an operation method for determining a degree by which a display of an electronic apparatus slides in/out according to an example embodiment.

FIG. 18 is a flowchart 1800 showing an operation method for determining a degree by which a display of an electronic apparatus 101 slides in/out according to an embodiment.

Referring to FIG. 18, in operation 1810, the first digitizer 510 may operate in a slide-in state of a display (e.g., a reduction state a screen).

In operation 1820, the electronic apparatus 101 may detect whether a slide-out of a display (e.g., expansion of a screen) starts. In an embodiment, the electronic apparatus may identify a state (e.g., a slide-in or -out state) of a display, based on information obtained through a sensor module (e.g., the sensor module 176 in FIG. 1). For example, the electronic apparatus may identify a state of a display by using data obtained by at least one of a Hall sensor, an angle encoder, a stretch sensor, a proximity sensor, an acceleration sensor, a gyro sensor (e.g., a gyroscope), a geomagnetic sensor, and a rotary sensor.

As a result of operation 1820, in case that a slide-out of a display (e.g., expansion of a screen) is not started, the first digitizer 510 may operate and the second digitizer 520 may not operate.

As a result of operation 1820, in case that a slide-out of a display (e.g., expansion of a screen) is started, in operation 1830, the second digitizer 520 may operate. In addition, the first digitizer 510 may operate even in a slide-out state of a display (e.g., an expansion state of a screen).

In operation 1840, it may be possible to detect whether noise is generated by an operation of the second digitizer 520. For example, it may be possible to detect whether noise is generated by the free stop of movement of the flexible display 220 at an intermediate point while the flexible display does not move by a predetermined distance in case that a display slides out (e.g., a screen is expanded).

As a result of operation 1840, in case that noise is not detected, operations of the first digitizer 510 and the second digitizer 520 may be maintained.

As a result of operation 1840, in case that noise is detected, in operation 1850, a distance, to which the flexible display 220 is moved, may be calculated based on strength of the noise. Based on the calculation result of the distance to which the flexible display 220 is moved, an area, in which the first digitizer 510 and the second digitizer 520 overlap each other, may be recognized. Thereafter, a signal output to and an input from the sensing patterns of the second digitizer 520, which overlap the first digitizer 510, may be blocked to prevent and reduce noise.

In an embodiment, by controlling the driving of the electronic apparatus 101, it may be possible to prevent or reduce the generation of noise by the free stop of movement of the flexible display 220 at an intermediate point while the flexible display 220 does not move by a predetermined distance in case that a display slides out (e.g., a screen is expanded).

Figure 19:
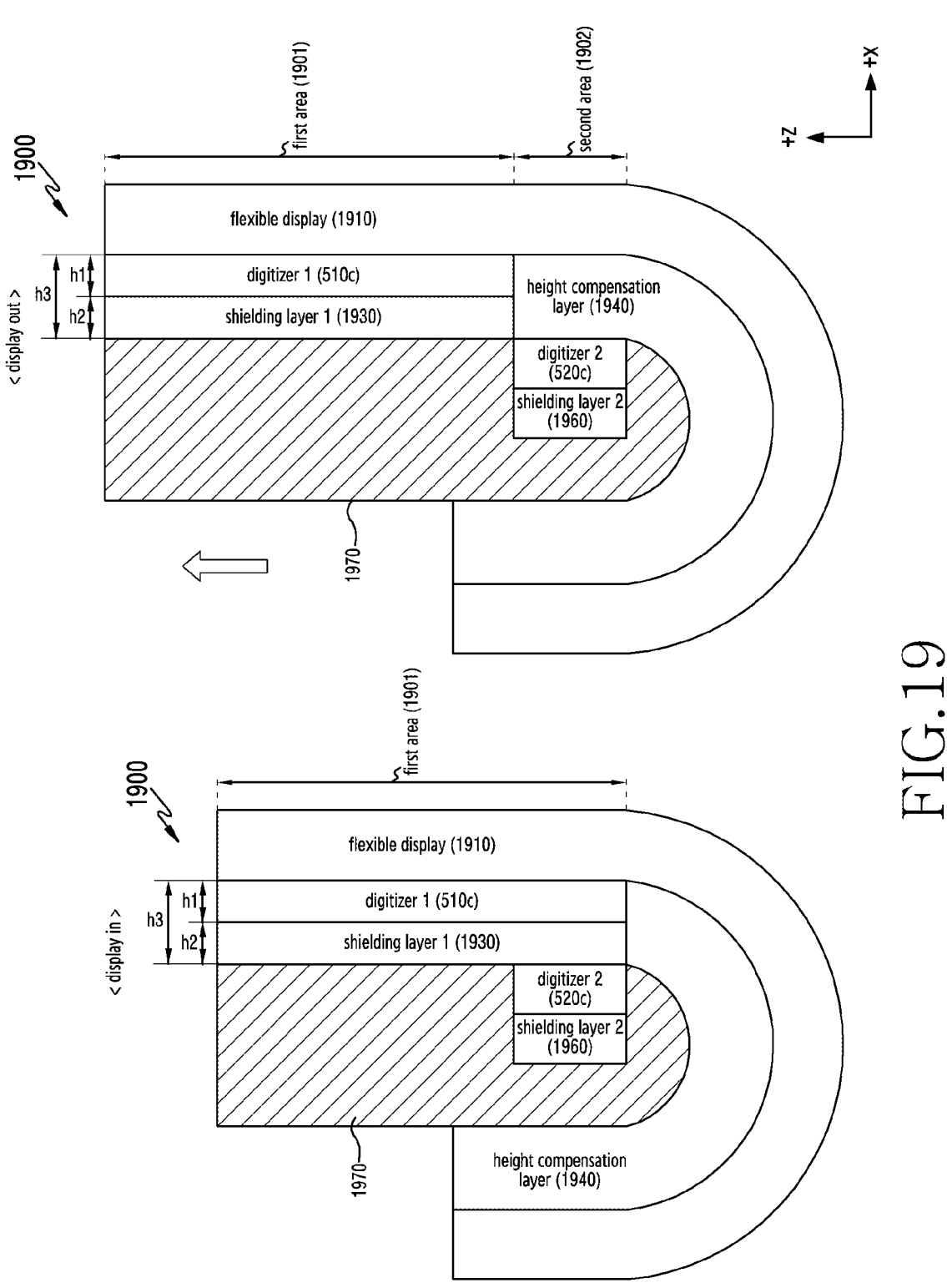
FIG. 19 is a view showing an example of an electronic apparatus in which a display slides in/out in the vertical direction according to various example embodiments.

FIG. 19 is a view showing an example of an electronic apparatus 1900 in which a flexible display 1910 slides in/out in the vertical direction according to various embodiments.

Referring to FIG. 19, in an electronic apparatus 1900, a display 1910 may slide in a vertical direction (e.g., the +z direction), so that a screen is expanded or reduced.

In an embodiment, a first digitizer 510c may be disposed on the lower part of the display 1910 of the electronic apparatus 1900. A first shielding layer 1930 may be disposed on the lower part of the first digitizer 510c in order to prevent or reduce electromagnetic interference on the first digitizer 510c. A second digitizer 520c may be disposed under the first shielding layer 1930. A second shielding layer 1960 may be disposed on the lower part of the second digitizer 520c in order to prevent or reduce electromagnetic interference on the second digitizer 520c. A height compensation layer 1940 may be an adhesive material or sponge and may be formed to have a predetermined thickness. The height compensation layer 1940 may be disposed at one side of the first digitizer 510c and the first shielding layer 1930. A thickness h3, which is the sum of a thickness h1 of the first digitizer 510c and a thickness h2 of the first shielding layer 1930, may be substantially the same as the thickness h3 of the height compensation layer 640.

In an embodiment, the flexible display 1910 may include a first area 1901 in a reduction state of a screen (e.g., a slide-in state of a display) and a second area 1902 in an expansion state of a screen (e.g., a slide-out state of a display).

As an example, the first digitizer 510c may be disposed to correspond to the first area 601. The second digitizer 520c may be disposed to detect an input by a stylus pen in the second area 1902 of the flexible display 1910. In case that a screen of the flexible display 1910 is expanded, the second digitizer 520c may be disposed to correspond to the second area 1902. The second digitizer 520c may be mounted to a housing.

In an embodiment, in case that the electronic apparatus 1900 is in a state where a display slides in, the first digitizer 510c may detect input by a stylus pen in the first area 1901 of the flexible display 1910. As an example, in case that the electronic apparatus 1900 is in a state where a display slides in (e.g., a screen is reduced), the first digitizer 510c may operate and the second digitizer 520c may not operate.

In an embodiment, in case that the electronic apparatus 1900 is in a state where a display slides in, the first area 1901 of the flexible display 1910 may be visible to the outside. In an example, the first digitizer 510c may be disposed at a portion corresponding to the first area 1901 on the rear surface (e.g., in the −x direction) of the flexible display 1910.

In an embodiment, in case that the electronic apparatus 1900 is in a state where a display slides out, the flexible display 1910 may slide in the first direction (e.g., the +z direction), and in case that the flexible display 1910 is extended, the second digitizer 520c may be disposed to correspond to the second area 1902 of the flexible display 1910. For example, the first digitizer 510c may be moved in the first direction (e.g., the +z-axis direction) together with the flexible display 1910, and thus may be disposed to correspond to the first area 1901. As the first digitizer 510c moves in the first direction (e.g., the +z-axis direction) together with the first area 1901 of the flexible display 1910, the height compensation layer 1940 may move in the first direction (e.g., the +z-axis direction). As described above, in case that the electronic apparatus 1900 is in a state where a display slides out, the second digitizer 520c may be positioned under the height compensation layer 1940.

Figure 20:
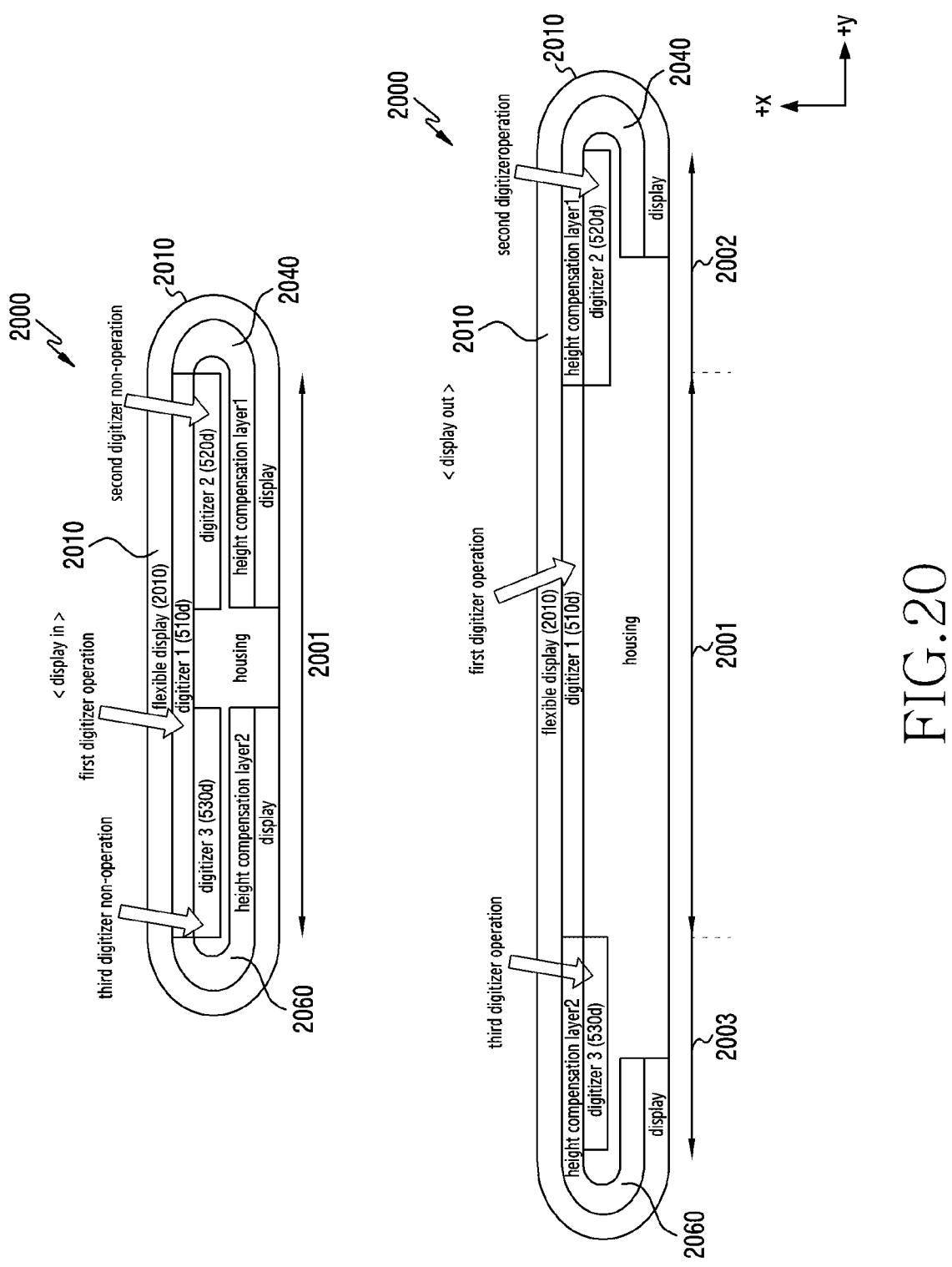
FIG. 20 is a view showing an example of an electronic apparatus in which a display slides in/out in the left/right direction according to various example embodiments.

FIG. 20 is a view showing an example of an electronic apparatus 200 in which a flexible display 2010 slides in/out in the left/right direction according to various embodiments.

Referring to FIG. 20, an electronic apparatus 2000 may include a flexible display 2010, a first digitizer 510d, a second digitizer 520d, a third digitizer 530d, a first height compensation layer 2040, and a second height compensation layer 2060. The electronic apparatus 2000 may be configured such that a screen is expandable in both the left and right directions.

In an embodiment, the flexible display 2010 may include a first area 2001, a second area 2002 and a third area 2003 formed by screen expansion. In case that a display is slides out (e.g., a screen is expanded), the flexible display 2010 may slides in both directions of the Y-axis (e.g., the y-axis direction), and thus the second area 2002 and the third area 2003 may be expanded.

In an embodiment, the first digitizer 510d may detect an input by a stylus pen to correspond to the first area 2001. A first shielding layer (not shown) may be disposed on the lower part of the first digitizer 510d. In an example, the first digitizer 510d and the shielding layer may be integrally formed. The second digitizer 520d may detect an input by a stylus pen to correspond to the second area 2002. A second shielding layer (not shown) may be disposed under the second digitizer 520d. The third digitizer 530d may detect an input by a stylus pen to correspond to the third area 2003. A third shielding layer (not shown) may be disposed under the third digitizer 530d.

According to various example embodiments, a crack or damage of a shielding sheet (e.g., an MMP sheet) and/or a digitizer sensing pattern according to expansion/reduction of a screen an electronic apparatus (e.g., a slidable phone or rollable phone) may be prevented or reduced.

According to various example embodiments, sensing interference and touch interference on a digitizer during expansion of a screen of an electronic apparatus (e.g., a slidable phone or a rollable phone) may be prevented or reduced.

According to various embodiments, an electronic apparatus 101 may include a slidable housing 210 including a first housing 211 forming side surfaces and a rear surface of the electronic apparatus and a second housing 212 connected, directly or indirectly, to the first housing so as to be movable relative to the first housing, a flexible display 220 including a first area 221 and a second area 222, the first area being exposed to the outside of the housing, the second area extending from the first area and being configured to be inserted into the housing and or withdrawn to the outside as the second housing slides relative to the first housing, a first digitizer 510 coupled to the first area of the flexible display, a plate (e.g., the first mid-plate 231 in FIG. 3) disposed inside the electronic apparatus, and a second digitizer 520 disposed on, directly or indirectly, the plate, the second digitizer being positioned to correspond to the second area in a state where the second area has been withdrawn to the outside of the housing.

The second digitizer according to an embodiment may be positioned under the first digitizer to overlap the first digitizer in a state where the second area of the flexible display has been inserted inside the housing.

The second digitizer according to an embodiment may be positioned so as not to overlap the first digitizer in a state where the second area of the flexible display has been withdrawn to the outside of the housing.

The second digitizer according to an embodiment may be positioned to overlap a height compensation layer in a state where the second area of the flexible display has been withdrawn to the outside of the housing According to an embodiment, a first shielding layer 630, which is positioned on the lower part of the first digitizer, may be included therein.

According to an embodiment, a second shielding layer 660, which is positioned on the lower part of the second digitizer, may be included therein.

According to an embodiment, in case that the second area of the flexible display is withdrawn to the outside of the housing, the first digitizer may move in a direction identical to a direction in which the flexible display moves, and the second digitizer may be fixed without movement.

According to an embodiment, in case that the second area of the flexible display is inserted into the housing, the first digitizer may be driven and the second digitizer may not be driven.

According to an embodiment, in case that the second area of the flexible display is withdrawn to the outside of the housing, the first digitizer and the second digitizer may be driven.

According to an embodiment, the second digitizer may be driven simultaneously as the second area of the flexible display is withdrawn to the outside of the housing.

According to an embodiment, the second digitizer may be driven in case that the second area of the flexible display has been withdrawn to the outside of the housing.

According to an embodiment, the first digitizer may include multiple first sensing patterns 1012 arranged in a first direction and multiple second sensing patterns 1014 arranged in a second direction orthogonal to the first direction, the second digitizer may include multiple third sensing patterns 1022 arranged in the first direction and multiple fourth sensing patterns 1024 arranged in the second direction, the multiple first sensing patterns and the multiple third sensing patterns may have different arrangement forms, and the multiple second sensing patterns and the multiple fourth sensing patterns have different arrangement forms.

According to an embodiment, the multiple first sensing patterns may be formed to have a first width, and the multiple second sensing patterns may be formed to have a second width wider than the first width.

According to an embodiment, the multiple third sensing patterns may be formed to have a third width, and the multiple fourth sensing patterns may be formed to have a fourth width wider than the third width.

According to an embodiment, the multiple first sensing patterns may be arranged to have a first interval, and the multiple second sensing patterns may be arranged to have a second interval narrower than the first interval.

According to an embodiment, the multiple third sensing patterns may be arranged to have a third interval, and the multiple fourth sensing patterns may be arranged to have a fourth interval narrower than the third interval.

According to an embodiment, a digitizer drive integrated circuit (IC) 1430 configured to drive the first digitizer and the second digitizer may be included therein, and the digitizer drive IC may be configured such that the second digitizer is set to have sensitivity higher than the first digitizer.

The electronic device according to various embodiments disclosed herein may be one of various types of electronic devices. The electronic devices may include, for example, a portable communication device (e.g., a smart phone), a computer device, a portable multimedia device, a portable medical device, a camera, a wearable device, or a home appliance. The electronic device is not limited to those described above.

It should be appreciated that various example embodiments and the terms used therein are not intended to limit the technological features set forth herein to particular embodiments and include various changes, equivalents, or alternatives for a corresponding embodiment. With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. As used herein, such terms as "a first", "a second", "the first", and "the second" may be used to simply distinguish a corresponding element from another, and does not limit the elements in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via at least a third element(s).

As used herein, the term "module" may include a unit implemented in hardware, software, or firmware, and may be interchangeably used with other terms, for example, "logic," "logic block," "component," or "circuit". The "module" may be a minimum unit of a single integrated component adapted to perform one or more functions, or a part thereof. For example, according to an embodiment, the "module" may be implemented in the form of an application-specific integrated circuit (ASIC). Thus, each "module" herein may comprise circuitry.

Various embodiments as set forth herein may be implemented as software (e.g., the program 140) including one or more instructions that are stored in a storage medium (e.g., the internal memory 136 or external memory 138) that is readable by a machine (e.g., the electronic device 101). For example, a processor (e.g., the processor 120) of the machine (e.g., the electronic device 101) may invoke at least one of the one or more stored instructions from the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various example embodiments may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each element (e.g., a module or a program) of the above-described elements may include a single entity or multiple entities, and some of the multiple entities may be separately disposed in any other element. According to various embodiments, one or more of the above-described elements may be omitted, or one or more other elements may be added. Alternatively or additionally, a plurality of elements (e.g., modules or programs) may be integrated into a single element. In such a case, according to various embodiments, the integrated element may still perform one or more functions of each of the plurality of elements in the same or similar manner as they are performed by a corresponding one of the plurality of elements before the integration. According to various embodiments, operations performed by the module, the program, or another element may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

The invention claimed is:

1. An electronic apparatus comprising:
a housing comprising a first housing forming at least side surfaces and a rear surface of the electronic apparatus, and a second housing connected to the first housing and slidably movable relative to the first housing;
a flexible display comprising a first area and a second area that extends from the first area, the first area configured to be viewably exposed to the outside of the housing, the second area configured to move into the housing and/or move out from the outside as the second housing slides relative to the first housing;
a first digitizer coupled to the first area of the flexible display and configured to move together with the flexible display as the second housing slides relative to the first housing; and
a second digitizer coupled to the first housing and configured to remain fixed regardless of the second housing sliding relative to the first housing.

2. The electronic apparatus of claim 1, wherein the second digitizer is fixed relative to the first housing and is configured to be positioned under the first digitizer to overlap the first digitizer in a state where the second area of the flexible display has been inserted inside the housing.

3. The electronic apparatus of claim 1, wherein the second digitizer is configured to be positioned so as not to overlap the first digitizer in a state where the second area of the flexible display has been withdrawn to the outside of the housing.

4. The electronic apparatus of claim 1, wherein the second digitizer is configured to be positioned to overlap a height compensation layer in a state where the second area of the flexible display has been withdrawn to the outside of the housing.

5. The electronic apparatus of claim 1, comprising a first shielding layer positioned on the lower part of the first digitizer.

6. The electronic apparatus of claim 1, comprising a second shielding layer positioned on the lower part of the second digitizer.

7. The electronic apparatus of claim 1, wherein the first digitizer is configured to move together with the second housing in a direction identical to a direction in which the flexible display moves in a case that the second area of the flexible display is withdrawn to the outside of the housing, and the second digitizer is fixed relative to the first housing without movement.

8. The electronic apparatus of claim 1, wherein the first digitizer is configured to be driven and the second digitizer is not driven, in a case that the second area of the flexible display is inserted into the housing.

9. The electronic apparatus of claim 1, wherein the first digitizer and the second digitizer are configured to be driven, in a case that the second area of the flexible display is withdrawn to the outside of the housing.

10. The electronic apparatus of claim 9, wherein the second digitizer is configured to be driven simultaneously as the second area of the flexible display is withdrawn to the outside of the housing.

11. The electronic apparatus of claim 9, wherein the second digitizer is configured to be driven in a case that the second area of the flexible display has been withdrawn to the outside of the housing.

12. The electronic apparatus of claim 1, wherein the first digitizer comprises multiple first sensing patterns arranged in a first direction and multiple second sensing patterns arranged in a second direction orthogonal to the first direction, the second digitizer comprises multiple third sensing patterns arranged in the first direction and multiple fourth sensing patterns arranged in the second direction, the multiple first sensing patterns and the multiple third sensing patterns comprise different arrangement forms, and the multiple second sensing patterns and the multiple fourth sensing patterns comprise different arrangement forms.

13. The electronic apparatus of claim 12, wherein the multiple first sensing patterns are formed to have a first width, and the multiple second sensing patterns are formed to have a second width wider than the first width.

14. The electronic apparatus of claim 12, wherein the multiple third sensing patterns are formed to have a third width, and the multiple fourth sensing patterns are formed to have a fourth width wider than the third width.

15. The electronic apparatus of claim 14, wherein the multiple first sensing patterns are arranged to comprise a first interval, and the multiple second sensing patterns are arranged to comprise a second interval narrower than the first interval.

16. The electronic apparatus of claim 12, wherein the multiple third sensing patterns are arranged to comprise a third interval, and the multiple fourth sensing patterns are arranged to comprise a fourth interval narrower than the third interval.

17. The electronic apparatus of claim 12, further comprising a digitizer driving IC configured for driving the first digitizer and the second digitizer, wherein the digitizer driving IC is configured to independently drive the first and second digitizers and to set a sensitivity of the second digitizer higher than a sensitivity of the first digitizer.

\* \* \* \* \*